United States Patent
Shinko et al.

(10) Patent No.: US 11,603,484 B2
(45) Date of Patent: Mar. 14, 2023

(54) PROCESS FOR SEAMING OF ARTIFICIAL TURF USING LOW-PRESSURE ADHESIVES

(71) Applicant: ICP CONSTRUCTION, INC., Andover, MA (US)

(72) Inventors: Andrew P. Shinko, Uniontown, OH (US); Anthony J. Taylor, Medina, OH (US); James C. Rack, Cincinnati, OH (US); James F. Rack, Cincinnati, OH (US)

(73) Assignee: ICP CONSTRUCTION, INC., Andover, MA (US)

(*) Notice: Subject to any disclaimer, the term of this patent is extended or adjusted under 35 U.S.C. 154(b) by 296 days.

(21) Appl. No.: 16/857,561

(22) Filed: Apr. 24, 2020

(65) Prior Publication Data

US 2021/0023576 A1 Jan. 28, 2021

Related U.S. Application Data

(60) Provisional application No. 62/878,091, filed on Jul. 24, 2019.

(51) Int. Cl.
| | | |
|---|---|---|
| *C09J 175/04* | (2006.01) | |
| *C09J 5/00* | (2006.01) | |
| *E01C 11/02* | (2006.01) | |
| *B05B 7/00* | (2006.01) | |
| *E01C 13/08* | (2006.01) | |
| *B05B 7/04* | (2006.01) | |

(52) U.S. Cl.
CPC .......... *C09J 175/04* (2013.01); *B05B 7/0018* (2013.01); *C09J 5/00* (2013.01); *E01C 11/02* (2013.01); *B05B 7/0408* (2013.01); *C09J 2475/00* (2013.01); *E01C 13/08* (2013.01)

(58) Field of Classification Search
CPC ........ C09J 175/04; C09J 5/00; C09J 2475/00; B05B 7/0018; B05B 7/0408; E01C 11/02; E01C 13/08
USPC ................................ 239/754, 525, 526, 578
See application file for complete search history.

(56) References Cited

U.S. PATENT DOCUMENTS

| | | |
|---|---|---|
| 3,680,168 A | 8/1972 | Krusche et al. |
| 6,345,776 B1 | 2/2002 | Hurray et al. |
| 6,410,609 B1 | 6/2002 | Taylor et al. |
| 6,602,113 B2 | 8/2003 | Lemieux |
| 6,691,898 B2 | 2/2004 | Hurray et al. |
| 6,840,462 B2 | 1/2005 | Hurray et al. |
| 7,364,634 B1 | 4/2008 | Irwin, Sr. |
| 7,399,514 B2 | 7/2008 | DeClerck |
| 7,717,357 B2 | 5/2010 | Gantenbein et al. |
| 9,062,168 B2 | 6/2015 | Taylor |
| 9,079,197 B2 | 7/2015 | Bina et al. |
| 9,211,552 B2 | 12/2015 | Gantenbein et al. |

(Continued)

OTHER PUBLICATIONS

International Search Report and Written Opinion of PCT/US20/40286.

*Primary Examiner* — Christopher S Kim
(74) *Attorney, Agent, or Firm* — Fredrikson & Byron, P.A.

(57) ABSTRACT

The invention pertains generally to a low-pressure (100-250 psi) process of seaming adjacent seams of artificial turf using a one-component or a two-component polyurethane adhesive using an apparatus which employs a payoff spool of base material in the front of the apparatus and an activation trigger adjacent the handle to begin the application of polyurethane spray foam adhesive by connectivity between the application trigger and the foam spray gun trigger.

17 Claims, 11 Drawing Sheets

(56) References Cited

U.S. PATENT DOCUMENTS

| | | |
|---|---|---|
| 9,233,385 B2 | 1/2016 | Gantenbein et al. |
| 9,481,790 B2 | 11/2016 | Taylor |
| 9,546,037 B1 | 1/2017 | Armes et al. |
| 9,593,222 B2 | 3/2017 | Taylor et al. |
| 9,630,767 B2 | 4/2017 | Gantenbein et al. |
| 9,631,327 B2 | 4/2017 | O'Connor et al. |
| 9,648,972 B2 | 5/2017 | LeBlanc et al. |
| 9,868,605 B2 | 1/2018 | Bishop |
| 10,029,266 B2 | 7/2018 | Gantenbein et al. |
| 10,059,824 B2 | 8/2018 | Taylor et al. |
| 10,351,334 B1 | 7/2019 | Dolezal et al. |
| 2004/0234719 A1 | 11/2004 | Jones |
| 2017/0130404 A1 | 5/2017 | Kruger et al. |
| 2018/0002869 A1 | 1/2018 | O'Connor et al. |
| 2018/0085766 A1 | 3/2018 | Gantenbein et al. |
| 2018/0171565 A1 | 6/2018 | Kruger et al. |
| 2019/0077934 A1 | 3/2019 | Shinko et al. |

PROCESS FOR SEAMING OF ARTIFICIAL TURF USING LOW-PRESSURE ADHESIVES

CROSS-REFERENCE TO RELATED APPLICATIONS

This patent claims priority to and fully incorporates by reference, provisional patent application Ser. No. 62/878,091 filed 24 Jul. 2019.

TECHNICAL FIELD

The invention described herein pertains generally to the process of seaming artificial turf using low-pressure polyurethane adhesives. More generically, the technology relates to the adhesive seaming of two adjacent edges of the artificial turf and to an applicator cart for applying the adhesive through a spray gun affixed to the front of the cart.

BACKGROUND OF THE INVENTION

The invention relates to an improved approach to the seaming of artificial turf using a low-pressure (<250 psi and preferably between 100-250 psi and more preferably between 130-250 psi) polyurethane foam spray gun for a two-component system and using a low-pressure (<250 psi and preferably between 100-250 psi and more preferably between 130-250 psi) polyurethane foam spray gun for a one-component or a two-component system and using either HFC (HydroFluoroCarbon) propellants or HFO (HydroFluoroOlefin) propellants and/or combinations thereof.

Artificial turf has come into widespread use on playing fields for sports such as football, soccer, lacrosse, and baseball. Although initially designed primarily for indoor use, artificial turf is also used on outdoor fields. It has advantages over natural turf in that it requires less maintenance and can be repaired quickly.

Artificial turf is usually composed of tufts of extruded polypropylene, polyethylene, or polyamide, "grass" ribbons on a backing sheet. The backing sheet is typically a woven polyester or polyacrylonitrile textile, having a coating of polyurethane or latex for dimensional stability and for securing the tufts in place on the backing sheet. The tufted backing sheet may be optionally coated with a secondary backing such as a heat set resin, commonly polyurethane for outdoor installations, for securing the tufts in place in the backing material. The turf is typically laid upon a resilient cushioning layer composed of rubber particles (often from scrap used tires) in a polymer binder. In some cases, the artificial turf is infilled with sand or other suitable material in order to keep the grass ribbons upright.

Artificial turf is often manufactured in strips of about 12-15 feet in width and delivered to installation sites in rolls. There are several approaches to joining roll sections of synthetic turf. One approach requires sewing or gluing the edges together. Another option secures the turf in place by laying down webs of strong polyamide fabric on the resilient cushion, or on another surface, at locations where they will underlie the seams of the artificial turf, spreading a layer of glue onto the fabric webs, and then laying down the artificial turf over the layer of glue. The process of laying down artificial turf is time-consuming and labor-intensive, requiring numerous workers, carrying glue in buckets or other containers, and spreading the glue with tools such as trowels. It is difficult to calculate the amount of glue required to lay down a given field of artificial turf and therefore, there is a possibility of costly shortages or excesses. The relatively long setting time of the glue slows the installation process. Moreover, the process can be hazardous, as the glues used may be flammable, and emit fumes that can present a health hazard, especially when used in an indoor environment. Another problem in the conventional installation of artificial turf is that some of the conventional glues used for securing artificial turf in place are affected by changes in humidity.

Hot melt adhesives can also be used resulting in a faster final bonding of the seams since there is no cure time. In this case, two strips of artificial turf are laid edge-to-edge on a support surface over a base tape having a lower surface resting on the support surface or resilient cushion and an upper surface of the base tape will carry a layer of hot melt adhesive. Then preferably a wheeled device is rolled down the seam, lifting the adjacent edges of turf, heating the hot melt adhesive, and then returning the edges of the strips of the artificial turf to the hot melt adhesive where the edges are firmly bonded. Hot melt adhesives reach a final bonding strength relatively quickly, however, particularly on sunny days the hot melt may be relatively slow to establish adequate grab and thus the installation can be slower and more labor intensive than when utilizing curing adhesive with good green strength. On hot and sunny days, some thermoplastic hot melts may re-soften. Finally, because thermoplastic hot melts are applied in a relatively thick fashion that becomes very hard in cold weather, and the seams may be raised higher than other parts of the field.

High-pressure polyurethane two-part systems have been employed. These high-pressure systems are extremely expensive (costing many tens of thousands of dollars and even higher) and may require very high pressure, e.g., 5,000-6,000 psi, although 3,000 psi is often employed. When the applicator gun is fully open, it can spray up to 30 lbs. of polyurethane adhesive per minute. With these high flow rates, 55-gallon drums are used for the "A" and "B" reactants and use a transfer pump system having up to 400 ft. (122 m) heated hoses. The product temperature as applied is typically 120° F.-150° F. (49° C.-65° C.). Application typically requires a spray rig which employed a gasoline or diesel-powered generator.

What is needed however, is a less-expensive system which employs low-pressure kits or refillable cylinders. Pressures for these systems typically are between 100-250 psi and can spray up to 2-5 lbs. of polyurethane adhesive per minute using a static mixer in the spray tip. Hose lengths for polyurethane kits are typically 9-25 ft. (3-8 m) but can be expanded to 25-100 ft. (8-30 m) when using refillable cylinders and the hoses are unheated or 75-150 ft. (23-46 m) when using heated hoses. Product use temperatures are typically 70-85° F. (21-29° C.).

SUMMARY OF THE INVENTION

The present invention is directed to a low-pressure one-component or a low-pressure two-component polyurethane adhesive used to seam adjacent layers of artificial turf, the spray gun applicator using either a two-stream or a three-stream configuration.

These and other objects of this invention will be evident when viewed in light of the drawings, detailed description and appended claims.

DETAILED DESCRIPTION OF THE INVENTION

The best mode for carrying out the invention will now be described for the purposes of illustrating the best mode known to the applicant at the time of the filing of this invention. The examples and figures are illustrative only and not meant to limit the invention, as measured by the scope and spirit of the claims.

Unless the context clearly indicates otherwise: the word "and" indicates the conjunctive; the word "or" indicates the disjunctive; when the article is phrased in the disjunctive, followed by the words "or both" or "combinations thereof" both the conjunctive and disjunctive are intended.

As used in this application, the term "approximately" is within 10% of the stated value, except where noted.

Figure 1:
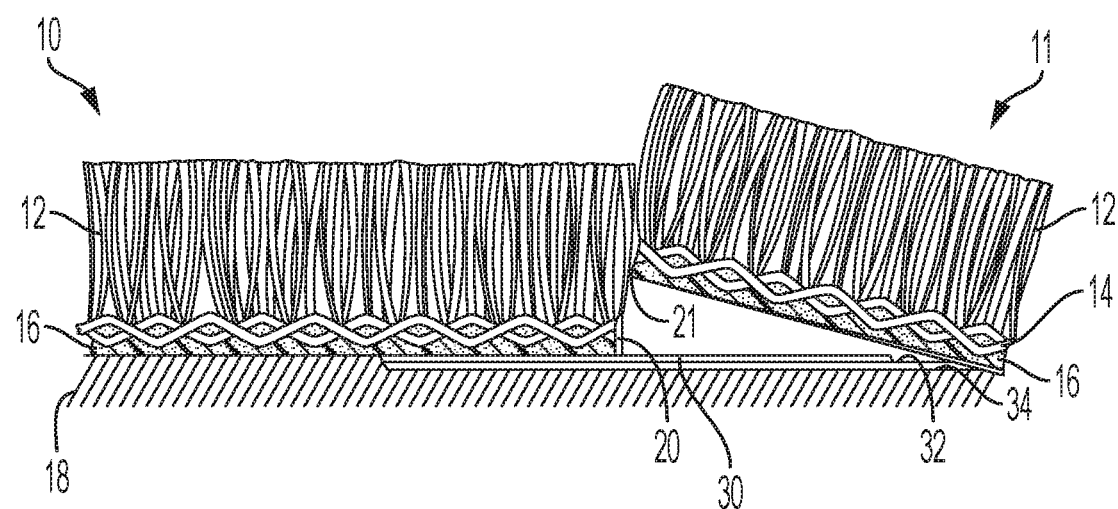
FIG. 1 is a cross-sectional view at a seam between two strips of artificial turf.

Referring now to the drawings for a better understanding of the invention, FIG. 1 is a cross-sectional view between the seam of two strips of artificial turf, 10,11. Artificial turf strips 10,11 each include upstanding filament material 12 resembling or simulating blades of grass extending upwards from a woven backing 14. It will be understood that many artificial surfaces will also include a particulate infill among the upstanding rows of fibers after installation. After the filament material 12 has been tufted in the backing 14, secondary backing 16 is often applied. This backing may be a single layer of resin such as urethane or latex, or it may also include a cushion layer. Generally, for an outdoor installation, it is important that the strips of artificial turf be sufficiently porous that appropriate drainage will occur without excessive puddling or accumulation of water that might damage the installation or render the surface unplayable.

The first artificial turf strip 10 has first edge 20 and second artificial turf strip 11 has second edge 21 and edges 20,21 are to be seamed in close proximity to one another, generally with less than $1/16^{th}$ of an inch separation. In order to accomplish this seaming, surface 18 on which the artificial turf is installed, frequently a resilient polymeric material, will have substrate 32 placed upon it at the approximate location of the seam. The substrate is optionally adhered to base material 18 by appropriate adhesive layer 34. Adhesive layer 34 may be a contact adhesive and the substrate provided with release tape for ease of installation or other adhesive systems may be used. Substrate 32 provides a consistent surface for the deposit of seaming adhesive 30. While some base materials might allow for direct application of the seaming adhesive, other base materials that could include dirt, sand, asphalt, and concrete, may benefit from the use of the substrate to support the adhesive.

Upon substrate 32 is deposited a seaming adhesive, such as a layer of polyurethane foam adhesive material 30 that is preferably a two-component polyurethane foam system. A desirable two-component polyurethane adhesive will provide excellent water resistance, hydrolytic stability, and appropriate working times for complex constructions.

Substrate 32 is wider than the layer of polyurethane adhesive material 30 so that it forms a barrier between the polyurethane adhesive and mounting surface 18. The width of the polyurethane adhesive should be about 1.5 to 4 inches on either side of the center line of the seam to provide a well distributed adhesive force. Application of an adhesive layer having overall width of about four to six inches and a thickness of about 10 to 300 mils is generally preferred.

Figure 2:
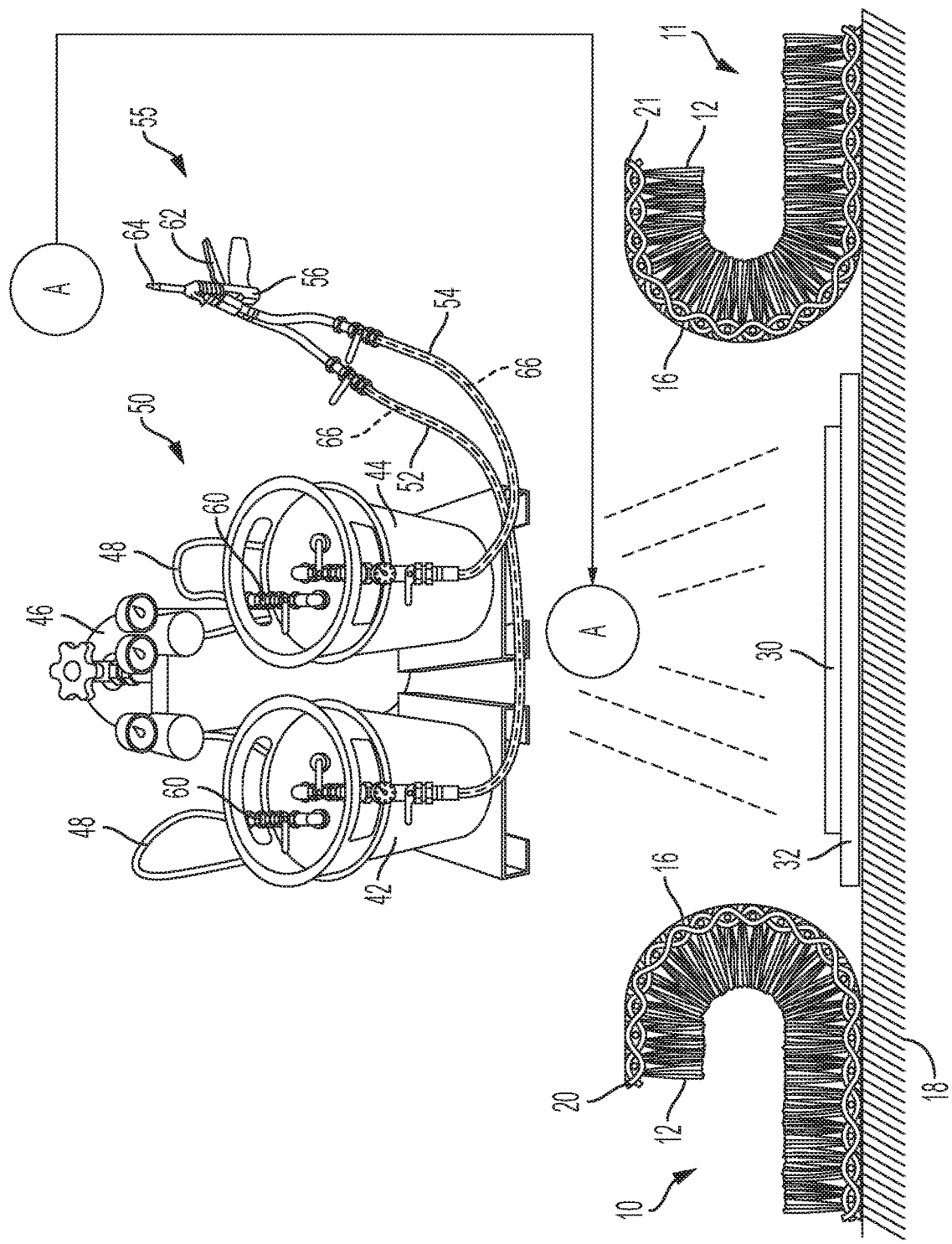
FIG. 2 is a cross-sectional view at a seam between two strips of artificial turf during the application of the polyurethane adhesive system to a substrate upon which the strips of artificial turf will be bonded at the bottom half of the Figure and a front perspective view of the system for rapidly applying an low-pressure adhesive a surface with a two-component polyurethane spray froth foam is illustrated on the upper half of the Figure.

In FIG. 2, the process of applying the polyurethane adhesive is illustrated with two strips of artificial turf 10,11 having first been positioned on base material 18 so that edges 20,21 which are to be seamed were in close proximity. First edge 20 on first artificial turf strip 10 and second edge 21 of second artificial turf strip 11 have been rolled back from one another leaving a space on base material 18. Substrate 32 is then positioned on base material 18 along the seam location. Substrate 32 provides a consistent surface for the deposit of seaming adhesive 30 which is delivered by a low-pressure spray gun 55 connected by hoses 52,54 which optionally may be heated, from the mixing unit or reactor. By controlling the temperature of the polyurethane components, and using catalysts, appropriate working times for complex constructions, typically on the order of minutes can be obtained in a wide range of temperature and humidity conditions.

Substrate 32 is wider than the layer of polyurethane adhesive 30 so that it forms a barrier between the polyurethane adhesive and the mounting surface. The width of the polyurethane adhesive should be about three to eight inches to provide a well distributed adhesive force. After the adhesive 30 has been delivered, the rolled edges 20,21 are again laid flat over adhesive 30 and substrate 32 and the seam may be rolled with weight to fully enmesh backing 16 of artificial turf strips 10,11 in adhesive 30 before it cures.

As better illustrated in FIG. 2, the application of a two-component spray polyurethane froth foam system is illustrated. In the Figure, two tanks 42 and 44 separately store the chemical components (the "A" component and the "B" component) of the two-component polyurethane foam adhesive. The chemical storage tanks 42 and 44 are ideally the same size, as the chemicals within are combined at equal rates during use of the spray polyurethane foam adhesive system 50. When the chemicals are not combined at equal rates, undesirable properties appear within the foam adhesive, such as incorrect consistency, incorrect color, uneven application, sputtering from the nozzle, and incorrect expansion rates of the foam. The size and fill pressure of tanks 42 and 44 are dependent on the nature of the job they are utilized on, but will ideally be transportable by the operator with the assistance of a cart, dolly, or other moving device (see 160 in FIG. 7), as the entire spray polyurethane foam adhesive system 50 is portable by the operator for convenient use at job sites.

Tanks 42 and 44 must be stored at a temperature below 120° F., more preferably at a temperature below 90° F., and most preferably at a consistent temperature of 80° F. Storage above 120° F. will substantially degrade the chemicals to an unusable state, and extended periods of storage above 90° F. may reduce the shelf life of the chemicals. Ideally, a temperature controlled "hot box" should be used for storage of the chemical storage tanks 42 and 44. A hot box is a small room or holding facility of a size that is at a minimum large enough to fit system 50. The hot box should be sufficiently insulated and heated to maintain a controlled and consistent temperature of approximately 80° F., ensuring the chemicals will be at an appropriate temperature for immediate use of system 50.

Proper temperature of the chemical components of the polyurethane foam are critical to optimal performance of any two-component adhesive foam spray system, including this invention. In one embodiment of this invention, the recommended chemical temperatures, when using the heated hose units are 70-80° F., and when using the unheated hose units are 75-85° F. It is important to note the chemicals must reach these temperatures through proper storage of the chemical storage tanks 42 and 44 or through passage inside the heated hoses. The chemicals cannot be immediately used if they have recently been stored or transported in an unheated environment and must first be allowed to achieve their recommended temperatures for proper performance of system 50. Chemical temperatures outside of the optimum ranges will adversely affect the yield, the mixing, the cure time and possibly even the properties of the foam adhesive.

Optionally, one or more means for pressurizing 46 the chemical storage tanks 42 and 44 are necessary, and ideally connect to chemical storage tanks 42 and 44 through a hose 48 and couplings 60 that attach to the top of tanks 42 and 44. Commonly, one or more inert gas bottles or cylinders 46 (more preferably nitrogen although other compressed gases may be used if not detrimental to the formation of the foam adhesive) are used to pressurize chemical storage tanks 42 and 44. Chemical storage tanks 42 and 44 are pressurized to preferably less than or equal to approximately 250 psi and more preferably less than or equal to approximately 200 psi. Proper pressure with the tanks 42 and 44 is critical to maintaining the proper ratio of chemicals during dispensing of the foam. Using nitrogen bottles or cylinders 46 with low pressure or inadequate levels of nitrogen can lead to inconsistent performance of the system, so it is preferable to use a full or mostly full nitrogen bottle or cylinder 46 when starting each adhesive application project. It is recommended for a certain embodiment of this invention to replace the nitrogen bottle or cylinder 46 when the gauge pressure of the nitrogen cylinder reaches the minimum level of 500 PSIG. Optionally a nitrogen manifold (not shown) which employs more than one bottle or cylinder can be used.

Chemical transport hoses 52 and 54 are connected to each chemical storage tank 42 and 44. The hoses 52 and 54 (not drawn to scale) serve as a conduit to transport each chemical component from its respective chemical storage tank 42 and 44 to the foam dispensing gun 55. The hoses 42 and 44 are connected to the chemical storage tanks 42 and 44 with coupling hardware and outlet valves.

Chemical transport hoses 52 and 54 are nominally limited in length, although they can be any available length at which the "A" and "B" foam components can be transported, typically less than 200 feet in length. Preferably, no pumps or motors are required to push the foam chemical components through the transport hoses. The hoses 52 and 54 will ideally have one or more heating elements 66 at least partially along in physical contact with the hoses and optimally at least partially embedded within the length of the tubing, tubing jacket, or protective sheath for continued heating control of the chemicals flowing therethrough. The continued heating of the chemicals throughout the transport hoses 52 and 54 allows for the system to be operated over a greater range of ambient air temperatures, as the chemicals will stay at their required temperature rather than loosing heat to a colder operating environment. Heated hoses allow the system to be operated earlier and later in the day when the temperatures are colder, as well as earlier and later in the year during the colder seasons. Heating elements 66 are powered by a standard 120V/60 Hz electrical outlet, which should be common at the site of operation, whether it be a construction site, home or business. The heated transport hose is thermostat controlled to maintain a constant operating temperature. If the transport hoses 52 and 54 are unheated, the system can only be operated when the ambient temperature is at or above the minimum required temperature of the chemicals for application, limiting the operation of the system to warmer times of the day and the year.

Storage and care of the hoses is also critical to proper performance of the system. Hoses 52 and 54, whether heated or unheated, should not be folded or kinked during storage or use, as it will impede the flow of the chemicals through the hose. The connection fittings of hoses 52 and 54 should always be properly lubricated to ensure maximum dependability of the connection, as well as lifespan of the connecting hardware. Hoses 52 and 54 and system 50 should be stored in a dry area when not in use. In an embodiment of this invention the hose is sheathed within a protective covering, such as woven fiberglass, so it can withstand mistreatment and improper use while still continuing to operate. Some illustrative examples of the misuse the hose can withstand while continuing to function is storage in temperatures below 0° F. for more than 2 days followed by heating of the elements, storage in temperatures above 90° F. for more than 2 days followed by heating of the elements, repeatedly twisting the gun end of hose, pulling on the gun end of hose, creating bends in the hose by pulling it around corners, dropping the hose from approximately 20 feet, running over the hose with a car and loaded semi-truck, slamming large objects on the hose, and storing the hose with chemicals inside for months.

Chemical transport hoses 52 and 54 connect chemical storage tanks 42 and 44 to foam adhesive dispensing gun 55. Foam dispensing gun 55 has a responsive trigger mechanism 62 to stop, start and optionally regulate the flow of the separate chemical components of the polyurethane foam adhesive through separate internal tubes within dispensing gun 55 that transport the chemical components into nozzle 64 that removably attaches to the front of dispensing gun 55. Dispensing gun 55 allows for a high flow rate, supporting the maximum application rate of nozzle 64 attachments or tips. Gun 55 and nozzle 64 are preferably made of plastic, and are disposable, but can be cleaned with appropriate solvents and reused if desired.

Figure 3:
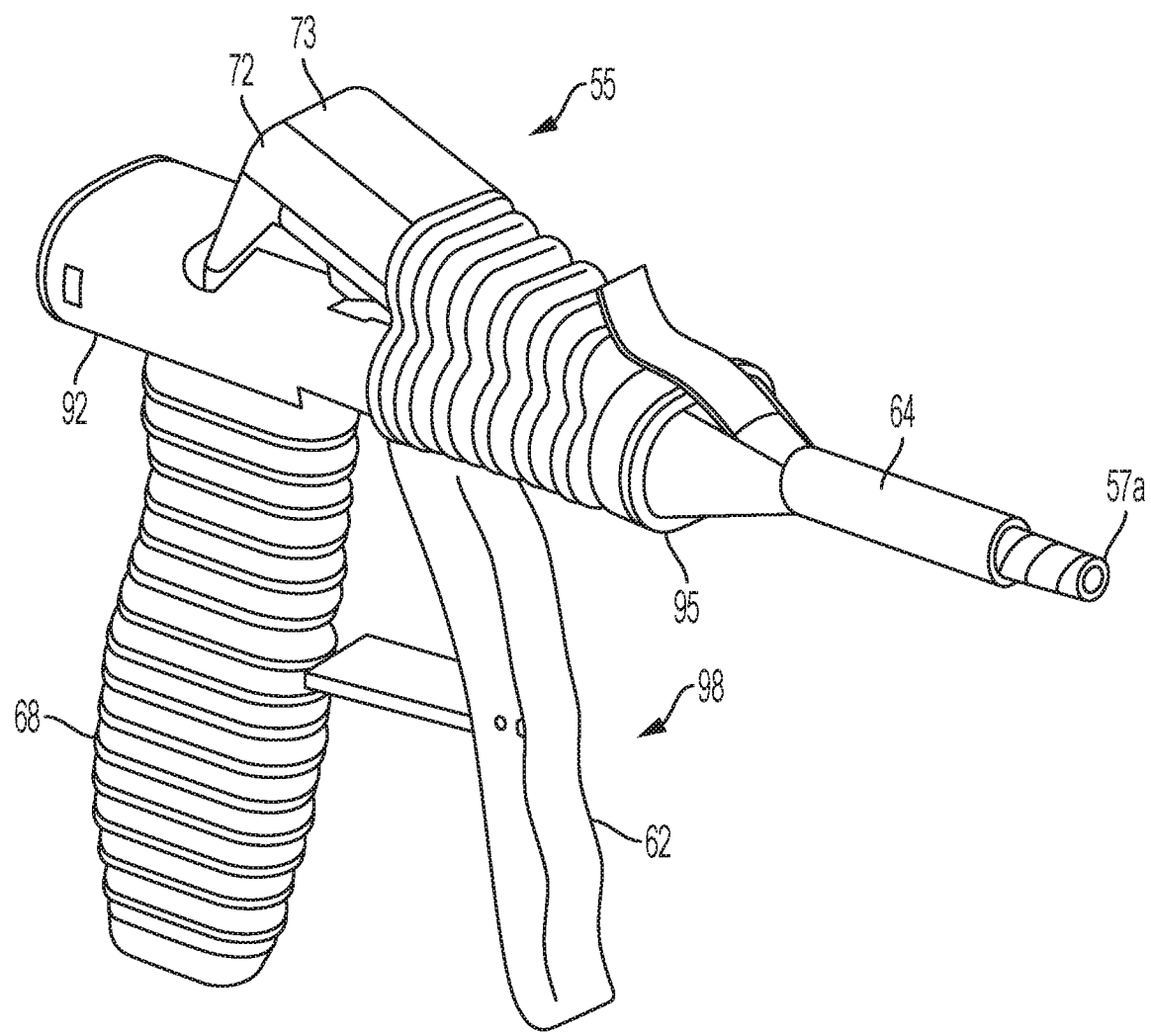
FIG. 3 is a perspective view of one embodiment of a two-stream low-pressure (130-250 psi) spray gun useful in the invention.

The two feed lines 52 and 54 outputting the two foam components into the dispensing gun 55 enter nozzle 64 at the end of the spray gun 56, where the two components are mixed and dispensed onto the surface to which adhesive is applied. The spray pattern (see spray pattern "A" of FIG. 2) of the dispensed foam is controlled by removable nozzle 54 that is attached to dispensing gun 55. The shape of the nozzle exit at its exterior extremity will determine the shape of the spray pattern achieved. Nozzles can have variously shaped tips. In FIG. 3, a circular tip 57a is illustrated, while in FIG. 4, a "V-shaped" notch 57b is illustrated, recognizing that the angle of the notch controls in large part, the shape of the spray pattern which results. It is also envisioned that exit shapes other than circular and/or "V-shaped" notches are within the scope of the invention, e.g., fan-shaped slits among others. The process described in the above preceding paragraphs is applicable when an end-user is applying the adhesive foam using long transport hoses and the end-user is walking adjacent to the area to be seamed.

As better illustrated in FIGS. 3-6, spray gun 55 may have various embodiments. As illustrated in FIG. 3, an airless two-component dispensing gun 55 is illustrated comprising a one-piece gun body 92 (which includes components to be described) with a detachably secured disposable nozzle 64. In one preferred embodiment, the gun is molded from polypropylene and the nozzle is molded from an ABS (Acrylonitrile-Butadiene-Styrene) plastic. It is to be appreciated that any suitable plastic material can be utilized for the dispensing gun 55. While one of the objects of the invention is to provide an inexpensive dispensing gun achieved in part by molding gun body 92 and nozzle 64 from plastic, the invention in its broader sense is not limited to a dispensing gun molded from any particular plastic and in a broader sense, includes metallic dispensing guns and/or dispensing guns with some metallic components.

Gun body 92 may be further defined as having integral portions including a longitudinally-extending valve portion 95 to which nozzle 64 is releasably connected and terminating at a longitudinally-extending trigger portion 98, in turn, terminating at longitudinally-extending spring portion (not shown) from which transversely extends handle portion 68. Within gun body housing 92 is a pair of hose openings 72, 73, canted as shown, to which the "A" and "B" hoses (not shown) are attached, respectively, by conventional quick connect couplings or other retaining mechanisms (e.g., friction fitting O-rings).

Dispensing gun 55 is also provided with pivotable trigger 62 extending within trigger body portion 98. It should be appreciated that when the operator grasps dispensing gun 56 about handle 68 for finger actuation of trigger 62, that the position of hose openings 72, 73 is such that the kit hoses will drape over the operator's forearm which is preferred over other conventional hose attachment positions on the dispensing gun. Canting hose openings 72, 73 is thus believed to provide some ergonomic benefit while contributing to the improved performance of dispensing gun 55 as described below. While a canted configuration is illustrated, the invention is not limited to that arrangement, and the "A" and "B" hoses may be positioned to enter the gun from the base of handle 68 (not shown) or through the rear of gun body 92 (also not shown).

Figure 4:
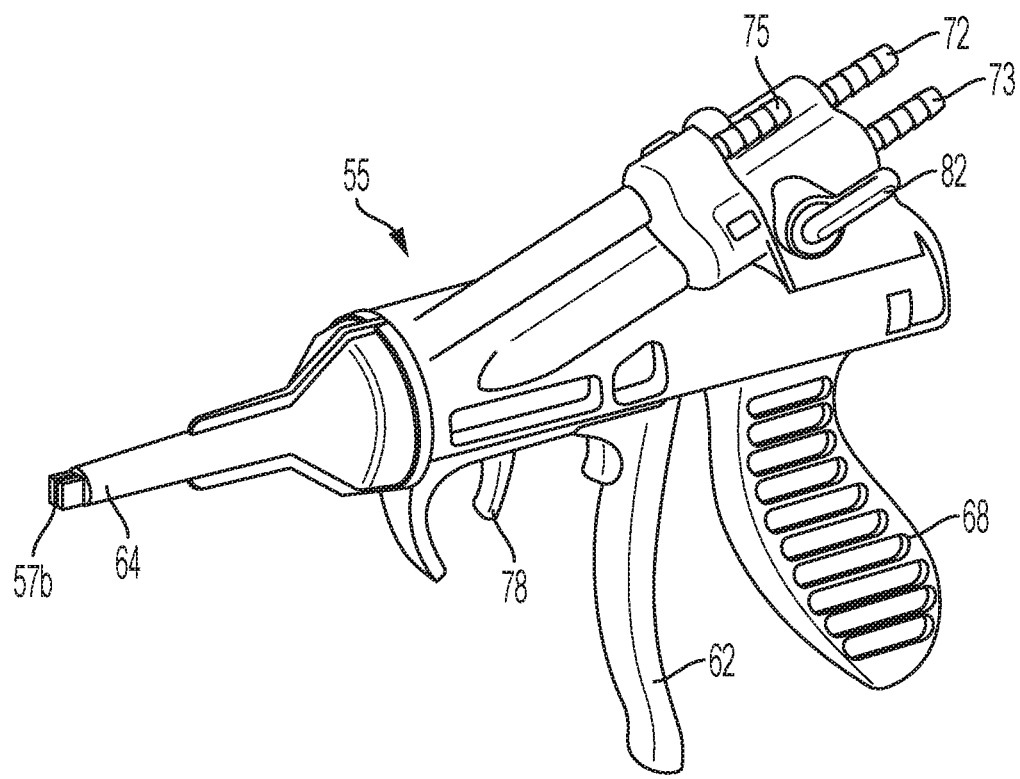
FIG. 4 is a perspective view of one embodiment of a low-pressure spray gun having an optional third stream useful in the invention.

FIG. 4 illustrates another arrangement of a spray gun and nozzle. As illustrated, spray gun 55 has a pair of canting hose openings 72,73 in communication with removable nozzle 64. In this embodiment, third hose opening 75 also communicates with removable nozzle 64. Safety lock 88 (illustrated in FIG. 5) is pivotally positioned within dispensing trigger 62 which is positioned before rearward-sloping curvilinear handle 68. Safety lock 48 is accessed and controlled typically via index finger control by the user. In one aspect of the invention, "twist and click" nozzle 64 (or any of the other removable nozzles) are temperature sensitive nozzles in which the nozzle changes color depending upon the temperature of the dispensed chemicals, thereby permitting the user to visually see if the chemicals are being dispensed at the proper temperature, which at least in part, governs the applied A/B ratio. Third stream trigger 78 is pivotally positioned in front of pivotable dispensing trigger 62 and governs the flow of the fluid (liquid or gas) within the channel of third hose 75. The dispensing gun is further provided with high/low or on/off output control lever 82 for further control by an operator. When used for high/low flow control, different diametered channels are bored into a transverse shaft of control lever 82.

Figure 5:
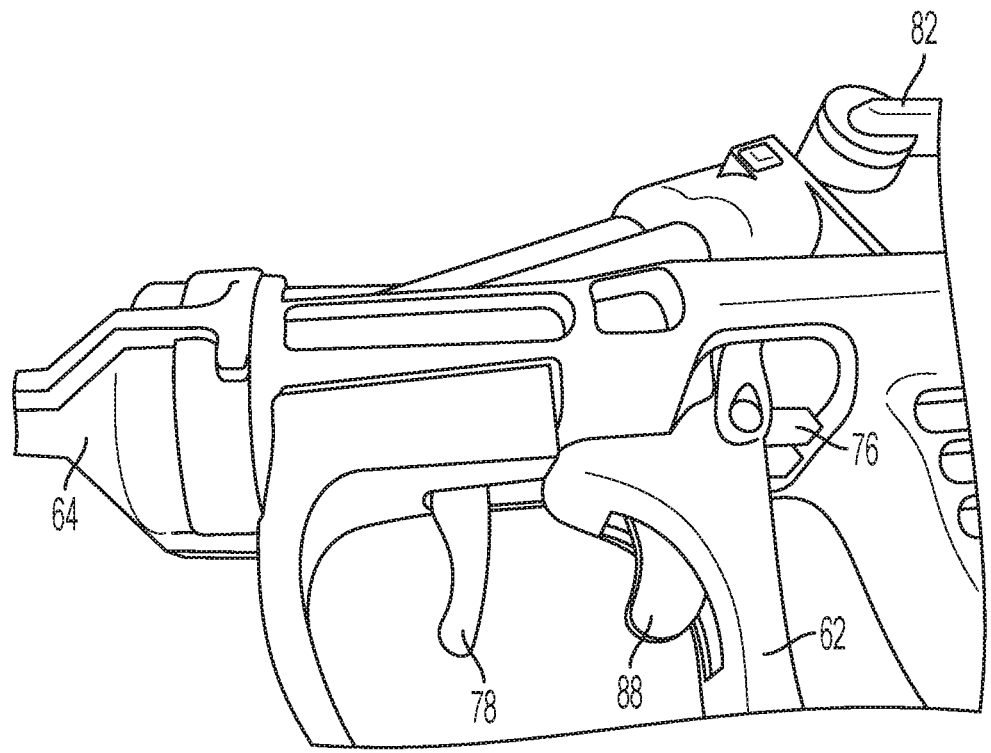
FIG. 5 is an enlarged perspective view from the bottom of the spray gun of FIG. 4.

FIG. 5 illustrates yoke 76 of safety lock 88 positioned within dispensing gun 55. As illustrated in the figure, safety lock is biased in a forward direction with yoke 76 impinging upon a rear lip of the housing of the dispensing gun. Depressing safety lock 88 pivotally elevates yoke 76 so as to permit rearward movement of pivotable dispensing trigger.

Figure 6:
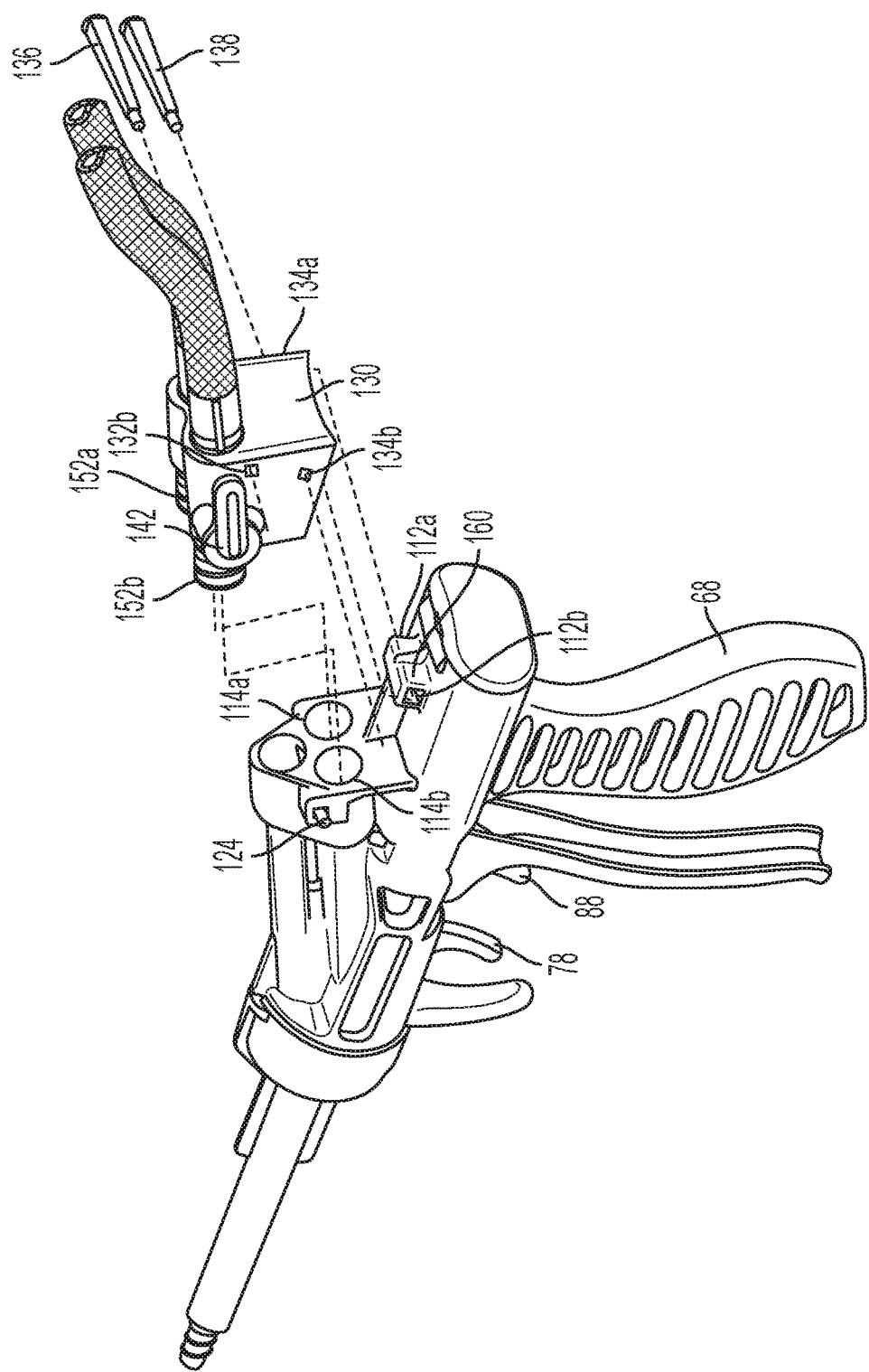
FIG. 6 is a partial assembly view of one embodiment of a low-pressure spray gun useful in the invention wherein only two of the three stream ports are used.

FIG. 6 illustrates another embodiment of the spray gun useful in this invention involving the insertion of separable module 130 into upwardly canted female channel openings 114a,114b by mating engagement with male projections 152a,152b respectively. These male projections typically have at least one, preferably two circumferential grooves with elastomeric or rubber O-rings positioned therein to minimize leakage. Transverse pin 138 secures module 130 onto the housing by insertion into aperture 134a, aperture 112a, and transverse channel 160 with subsequent egress through aperture 112b as well as through aperture 134b. This locking mechanism for separable module 130 to gun housing prevents vertical movement contrasted to when no transverse pin 138 was employed. Transverse pin 136 is also employed for securing engagement of the "A" and "B" hoses into the gun by tangential contacting engagement with a groove in the end of the hoses.

Referring to FIG. 4, a further variation is disclosed and described in which a one-component foam is dispensed through one inlet port 72 or 73 using spray dispensing gun 55. The one-component foam will have all reactants stored in just one cylinder. However, since one-component foams typically have longer set tack times than two-component foams, the unused inlet port 72 or 73 will contain an accelerator (e.g. catalyst) to reduce the tack time of the one-component adhesive foam.

Third Stream Content

The inclusion of a third stream as illustrated in FIGS. 4-5 is not only effective for surface cleaning applications but has applicability to modify the proportions of reactants which are dispensed through the gun, particularly vis-à-vis the contents of the "B" cylinder. For example, current foam dispensing spray guns employ a combination of blowing agent and reactant(s) and typically a pressurizing agent, typically an inert gas in the A/B cylinders. In one aspect of this invention, the amount of blowing agent is reduced (and in some applications eliminated) by introducing the blowing agent, which in some applications may be air, through the third-stream input port. The liquid contents of the A/B cylinders are added via the combination of inert gas plus blowing agent vapor pressure. In one aspect of this invention, when the blowing agent is added via the third stream, some or all of the contents of the "B"-side cylinder may be added via a liquid pump positioned on the cylinder.

The addition of a third stream allows an end-user to selectively add some, or a portion of, or all of the following chemicals via the third stream, the list being illustrative and not exhaustive.

Polyols

As illustrated in a non-exhaustive, non-exclusive, exemplary list below, there are a myriad of polyols (both polyester polyols and polyether polyols) which are useful in effecting the reaction with a diisocyanate to form a foam having varying characteristics. The ability to add widely varying amounts of polyols and/or different polyol combinations could easily be affected via either supplementing existing amounts of "B-side" polyol(s) via the third stream or by essentially eliminating "B-side" polyol(s) and making their addition via the third stream. In one aspect of the invention, the polyol(s) are added by using a pumping mechanism from a "B-side" cylinder or other container, and the third stream is employed to add the blowing agent and/or pressurizing agent.

Polyester Polyol(s)

PS 2352

| Hydroxyl Number, mg KOH/g | 230-250 |
| Water, % by wt., max. | 0.15 |
| Acid Number, mg KOH/g, max. | 0.6-1.0 |
| Viscosity at 77° F. (25° C.), cP | 2,000-4,500 |
| Equivalent Weight (average) | 234 |
| Molecular Weight (average) | 468 |
| Color, Gardner | 4 |
| Density at 77° F. (25° C.), lb/U.S. gal | 9.9 |
| n | 1-30 |
| Specific Gravity at 77° F. (25° C.) | 1.19 |

TB-350

| Hydroxyl Number, mg KOH/g | 335-365 |
| Water, % by wt, max. | 0.15 |
| Acid Number, mg KOH/g, max. | 0.5-2.0 |
| Viscosity at 77° F. (25° C.), cP | 2,500-3.500 |
| Color, Gardner | 4-5 |
| Specific Gravity at 77° F. (25° C.) | 1.233 |
| Functionality | 2.2 |
| n | 1-25 |

Without being held to any one theory or mechanism of operation, it is believed that all things considered, it is understood that polyether polyols have better adhesive properties than polyester polyols. This is believed to be due to the lower polarity of polyether polyols, which reduces surface tension and therefore increases wetting with the substrate. On the other hand, polyester polyols allow for increased tensile properties and higher modulus. It is therefore beneficial to determine a means of introducing polyether polyol or polyols into an adhesive formula along with polyester polyols. A formula with a reduced catalyst package may be utilized in order to meet the reactivity profile of the adhesive polyurethane product. By reducing the amount of catalyst present in the system, and through general formulation adjustments, a product with a polyether polyol loading on the B-side blend was developed. Furthermore without being bound to any one theory or mode-of-operation, it is believed that the use of glycerin as a fluoride ion scavenger may beneficially increase the shelf life stability of this product. Note that it is now possible to have significant amounts of polyester polyols and polyether polyols in the composition, provided that at least some glycerin (synonymously "glycerol") is also present, a simple triol. It is recognized that the fluoride ion scavenger will preferably have a functionality of ≥2.0, preferably ≥2.2.

While glycerin is one specific example of a triol with scavenging capabilities, the invention is not limited to such.

In fact, lower molecular weight polyols, e.g., a triol or specifically a polyol (including diols) having a functionality ≥2, preferably ≥2.2 are believed to be useful in this invention. Molecular weight ranges of the polyol(s) are anticipated to range between ~90 to ~1500 g/mol are believed to be applicable to this invention.

| | Polyether Polyol(s) |
|---|---|
| Voranol 360 | sucrose polyether polyol based on a sucrose-glycerol mixture with a functionality of ~4.5 having a hydroxyl number of ~360 wherein x ranges from 1 to 100 |
| Multranol 8114 | aromatic amine-initiated polyether polyol having a hydroxyl number of about 388 mg KOH/g and a functionality of 4 |
| Poly-G ® 30-280 | glycerine-based oxypropylated polyether polyol having a functionality greater than or equal to 3 and a molecular weight of about 600, an OH number of about 274, an acid number (max) of 0.05, an average pH of about 6.5 wherein n ranges from 2 to 50 |
| Poly-G ® 30-168 | 1,2,3-propanetriol, methyloxirane polymer wherein n ranges from 2 to 50 |
| Poly-G ® 30-42 | Polyether triol having an average molecular weight of ~4,000, an OH number of about 40, an acid number (max) of ~0.03, an average pH of about 5.5 |
| Jeffol ® G 31-35 | ethylene oxide triol, ethylene oxide capped and glycerine initiated wherein the polyol has a hydroxyl number of ~35 and a M.W. of ~4800 and provides for chain entanglement and packing without distorting a profile wherein x ranges from 2 to 50. |
| Carpol TEAP-265 | 3,3',3''-[nitrilotris(ethane-2,1-diyloxy)]tripropan-1-ol |

| Polyether Polyol(s) | |
|---|---|
| Poly-G ® 70-600 | HO─(─(CH$_2$)$_2$─O─)$_{\overline{n}}$(CH$_2$)$_2$─N─(CH$_2$)$_2$─(─O─(CH$_2$)$_2$─)$_{\overline{n}}$OH<br>with side chain (CH$_2$)$_2$─(─O─(CH$_2$)$_2$─)$_{\overline{n}}$OH<br><br>Ethoxylatedtriethanolamine wherein n ranges from 1 to 50 |
| Poly-G ® 55-28 | HO─(─C$_2$H$_4$O─)$_{\overline{m}}$(─C$_3$H$_6$O─)$_{\overline{n}}$CH$_2$CH─(─OC$_3$H$_6$─)$_{\overline{n}}$(─OC$_2$H$_4$─)$_{\overline{m}}$OH<br>with side chain CH$_2$─(─OC$_3$H$_6$─)$_{\overline{n}}$(─OC$_2$H$_4$─)$_{\overline{m}}$OH<br><br>Block copolymer of propylene oxide and polyethethylene oxide having a nominal molecular weight of 4,000 and wherein n & m are integers ranging from 2 to 50. |

Flame Retardants and/or Plasticizers

As illustrated in a non-exhaustive, non-exclusive, exemplary list below, there are a myriad of flame retardants and/or plasticizers which are useful in modifying the properties of the reaction of a polyol with a diisocyanate to form a foam having varying characteristics. The ability to add widely varying amounts of flame retardants/plasticizers and/or different flame retardant/plasticizer combinations could easily be effected via either supplementing existing amounts of "B-side" flame retardant(s)/plasticizer(s) via the third stream or by essentially eliminating "B-side" flame retardant(s)/plasticizer(s) and making their addition via the third stream.

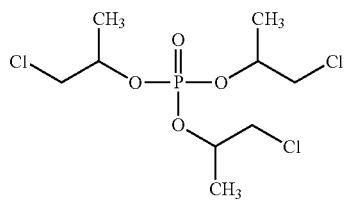

Tris (1-chloro-2-propyl) phosphate ("TCPP")

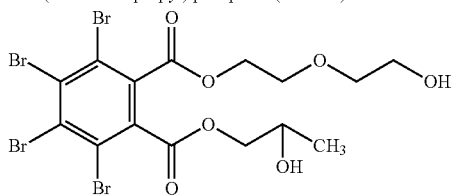

Tetrabromophthalate diol ("PHT4-diol")

Surfactants

As illustrated in a non-exhaustive, non-exclusive, exemplary list below, there are a myriad of surfactants which are useful in modifying the properties of the reaction of a polyol with a diisocyanate to form a foam having varying characteristics. The ability to add widely varying amounts of surfactants and/or different surfactant combinations could easily be affected via either supplementing existing amounts of "B-side" surfactant(s) via the third stream or by essentially eliminating "B-side" surfactant(s) and making their addition via the third stream.

| Trade name | Composition (if known) |
|---|---|
| Tegostab ® B-8433 | Polyether polydimethylsiloxane copolymer |
| Dabco ® LK ®-443 | Non-silicone organic surfactant |
| Nonoxynol-9 | CH$_3$(CH$_2$)$_8$─⌬─(─O─)$_{9.5}$OH<br><br>the hydroxyl number is ~88 |
| L12-8 ethoxylated alcohol (dodecyl alcohol ethoxylate) | CH$_3$(CH$_2$)$_{12}$─O─(─O─)$_8$H |

Catalysts

As illustrated in a non-exhaustive, non-exclusive, exemplary list below, there are a myriad of catalysts which are useful in effecting the reaction of a polyol with a diisocyanate to form a foam having varying characteristics. The ability to add widely varying amounts of catalysts and/or different catalyst combinations could easily be effected via either supplementing existing amounts of "B-side" catalyst(s) via the third stream or by essentially eliminating "B-side" catalyst(s) and making their addition via the third stream.

| Trade name and/or Chemical name | Chemical structure |
|---|---|
| Dabco ® K-15<br>(Potassium octoate/DEG (diethylene glycol)) |  |

| Trade name and/or Chemical name | Chemical structure |
| --- | --- |
| Polycat ® -12 (Dicyclohexylmethyl amine) | |
| DMDEE (Dimorpholinodiethyl ether) | |
| Polycat ®-5 (N,N,N',N',N''-pentamethyldiethylenetriamine) | |
| Polycat ®-8 (N,N-dimethylcyclohexylamine) | |
| N,N-dimethylhexylamine | |
| NEM (N-Ethylmorpholine) | |
| NMM (N-Methylmorpholine) | |
| Polycat ® 15 (Tetramethyldipropylene triamine) | |
| DMP (N,N'-Dimethylpiperazine) | |
| Dabco ® 33LV (1,4-Diazabicyclo[2.2.2]octane) | |

| Trade name and/or Chemical name | Chemical structure |
| --- | --- |
| Dabco ® T (N,N,N'-trimethylaminoethyl ethanolamine) | 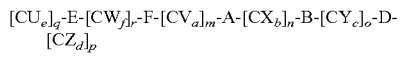 |
| DABCO ® T-120 (dibutyl tin dilauryl mercaptide) | $(CH_3(CH_2)_3)_2-Sn-S(CH_2)_{11}CH_3$ |
| Jeffamine ® D-2000 polyoxypropylenediamine | $H_2N-CH-CH_2-O-[CH_2-CH]_{33.1}-NH_2$ with $CH_3$ groups |

Other

Water can be both beneficial and deleterious to catalyst foams, depending on the blowing agent used or the end-use application. The ability to add widely varying amounts of water could easily be effected via either supplementing existing amounts of "B-side" water via the third stream or by essentially eliminating "B-side" water and making its addition via the third stream.

Blowing Agent(s)

As illustrated in a non-exhaustive, non-exclusive, exemplary list below, there are a myriad of blowing agents which are useful in effecting the reaction of a polyol with a diisocyanate to form a foam having varying characteristics. The ability to add widely varying amounts of blowing agents and/or different blowing agent combinations could easily be effected via either supplementing existing amounts of "A-side" and/or "B-side" blowing agent(s) via the third stream or by essentially eliminating blowing agent(s) and making their addition via the third stream.

In one aspect of the invention, blowing agents having up to four carbon atoms in their backbone and which are useful in this invention fall within the general formula (I) illustrated below:

$[CV_a]_m$-A-$[CX_b]_n$-B-$[CY_c]_o$-D-$[CZ_d]_p$ wherein

C is a carbon atom;

V, X, Y & Z are independently selected from the group consisting of H, F and Cl;

a & d are independently selected from the integral values ranging from 0 to 3 inclusive;

b & c are independently selected from the integral values ranging from 0 to 2 inclusive;

o, p & n are equal to 1;

m is selected from the integral values ranging from 0 to 1 inclusive;

A, B & D are covalent bonds sufficient to satisfy the available bonding sites of adjacent carbon atoms, if such carbon atoms are present; and the blowing agent, including miscible blends and azeotropes thereof, having a boiling point between approximately −5° C.-50° C., and an ozone depletion potential of essentially zero; and in a preferred embodiment, the blowing agent is non-flammable, recognizing that co-blowing agents may be flammable, although in a more preferred embodiment, the co-blowing agent will be added in such an amount as to render the combination non-flammable either as a blend or as an azeotrope.

In another aspect of the invention, and listed more generically, the blowing agents having up to six carbon atoms in their backbone and which are useful in this invention fall within the general formula (II) illustrated below:

$[CU_e]_q$-E-$[CW_f]_r$-F-$[CV_a]_m$-A-$[CX_b]_n$-B-$[CY_c]_o$-D-$[CZ_d]_p$ wherein C is a carbon atom;

U, W, V, X, Y and Z are independently selected from the group consisting of H, F and Cl;

d & e are independently selected from the integral values ranging from 0 to 3 inclusive;

a, b, c & f are independently selected from the integral values ranging from 0 to 2 inclusive;

o, p & n are equal to 1;

m, q & r are independently selected from the integral values ranging from 0 to 1 inclusive;

A, B, D, E and F are covalent bonds sufficient to satisfy the available bonding sites of adjacent carbon atoms, if such carbon atoms are present;

the blowing agent having a boiling point between approximately −5° C.-50° C., and an ozone depletion potential of not greater than 0.05; and in a preferred embodiment, the blowing agent is non-flammable, recognizing that co-blowing agents may be flammable, although in a more preferred embodiment, the co-blowing agent will be added in such an amount as to render the combination non-flammable either as a blend or as an azeotrope.

As illustrated in a non-exhaustive, non-exclusive, exemplary list below, there are a myriad of blowing agents which are useful in effecting the reaction of a polyol with a diisocyanate to form a foam having varying characteristics. The ability to add widely varying amounts of blowing agents and/or different blowing agent combinations could easily be effected via either supplementing existing amounts of "A-side" and/or "B-side" blowing agent(s) via the third stream or by essentially eliminating blowing agent(s) and making their addition via the third stream.

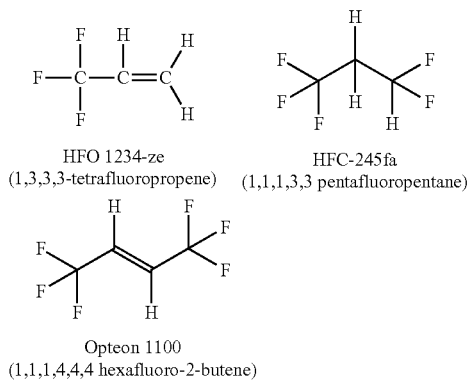

HFO 1234-ze
(1,3,3,3-tetrafluoropropene)

HFC-245fa
(1,1,1,3,3 pentafluoropentane)

Opteon 1100
(1,1,1,4,4,4 hexafluoro-2-butene)

As used in this application, a non-limiting definition for the term "blowing agent" which includes miscible mixtures and azeotropes of blowing agents, means a propellant or solvent which are useful and provide efficacy to various applications in the form of performance, pressure performance, or solubility, without deleterious effect due to molar gas volume, flammability migration, or GWP reduction, yet which have a vapor pressure within defined limits as defined herein. Exemplary and non-limiting blowing agents include HFC-245fa (Honeywell Intl.), namely 1,1,1,3,3 pentafluoropentane or HFO-1336mzz or sold under the trade name Opteon 1100 (Chemours), namely 1,1,1,4,4,4 hexafluoro-2-butene.

And while the above identified blowing agents are preferred from an ozone depletion potential (ODP) perspective as well as a global warming potential (GWP) perspective, the third stream within the spray gun offers the ability to use a myriad of blowing agents, alone or in combination with others, the combination in one aspect including all non-flammable blowing agents, while in another aspect including a combination of non-flammable and flammable blowing agents. A non-limiting list of other blowing agents includes, but is not limited to air, $C_1$ to $C_6$ hydrocarbons, $C_1$ to $C_8$ alcohols, ethers, diethers, aldehydes, ketones, hydrofluoroethers, $C_1$ to $C_4$ chlorocarbons, methyl formate, water, carbon dioxide, $C_3$ to $C_4$ hydrofluoroolefins, and $C_3$ to $C_4$ hydrochlorofluoroolefins. Examples of these non-exclusively include one or more of difluoromethane, trans-1,2-dichloroethylene, difluoroethane, 1,1,1,2,2-pentafluoroethane, 1,1,2,2-tetrafluoroethane, 1,1,1,2-tetrafluoroethane, 1,1,1-trifluoroethane, 1,1-difluoroethane, fluoroethane, hexafluoropropane isomers, including HFC-236fa, pentafluoropropane isomers of HFC-245fa, heptafluoropropane isomers, including HFC-227ea, hexafluorobutane isomers, and pentafluorobutane isomers including HFC-365mfc, tetrafluoropropane isomers, and trifluoropropene isomers (HFO-1243). Specifically included are all molecules and isomers of HFO-1234, including 1,1,1,2-tetrafluoropropene (HFO-1234yf), trans-1-chloro-3,3,3-trifluoropropene (HFO-1233zd(E)) sold under the trade name Solstice LBP by Honeywell and cis- and trans-1,2,3,3-tetrafluoropropene (HFO-1234ye), HFC-1233zd, and HFC-1225ye. The blowing agents may be used in combination with at least one co-blowing agent which non-exclusively include: hydrocarbons, methyl formate, halogen containing compounds, especially fluorine containing compounds and chlorine containing compounds such as halocarbons, fluorocarbons, chlorocarbons, fluorochlorocarbons, halogenated hydrocarbons such as hydrofluorocarbons, hydrochlorocarbons, hydrofluorochlorocarbons, hydrofluoroolefins, hydrochlorofluoroolefins, $CO_2$, $CO_2$ generating materials such as water, and organic acids that produce $CO_2$ such as formic acid. Examples non-exclusively include low-boiling, aliphatic hydrocarbons such as ethane, propane(s), i.e. normal pentane, isopropane, isopentane and cyclopentane; butanes(s), i.e. normal butane and isobutane; ethers and halogenated ethers; trans 1,2-dichloroethylene, pentafluorobutane; pentafluoropropane; hexafluoropropane; and heptafluoropropane; 1-chloro-1,2,2,2-tetrafluoroethane (HCFC-124); and 1,1-dichloro-1-fluoroethane (HCFC-141b) as well as 1,1,2,2-tetrafluoroethane (HFC-134); 1,1,1,2-tetrafluoroethane (HFC-134a); 1-chloro 1,1-difluoroethane (HCFC-142b); 1,1,1,3,3-pentafluorobutane (HFC-365mfc); 1,1,1,2,3,3,3-heptafluoropropane (HCF-227ea); trichlorofluoromethane (CFC-11), dichlorodifluoromethane (CFC-12); 1,1,1,3,3,3-hexafluoropropane (HFC-236fa); 1,1,1,2,3,3-hexafluoropropane (HFC-236ea); difluoromethane (HFC-32); difluoroethane (HFC-152a); trifluoropropenes, pentafluoropropenes, chlorotrifluoropropenes, tetrafluoropropenes including 1,1,1,2-tetrafluoropropene (HFO-1234yf), 1,1,1,2,3-pentafluoropropene (HFO-1225ye), and 1-chloro-3,3,3-trifluoropropene (HCFC-1233zd). Combinations of any of the aforementioned are useful including blends and azeotropes thereof. The relative amount of any of the above noted additional co-blowing agents, as well as any additional components included in present compositions, can vary widely within the general broad scope of the present invention according to the particular application for the composition, and all such relative amounts are considered to be within the scope hereof.

As used herein, a non-limiting definition for the term "co-blowing agent" which includes mixtures or miscible blends and/or azeotropes of blowing agents, means a one or more co-blowing agents, co-propellants, or co-solvents which are useful and provide efficacy to various applications in the form of performance, pressure performance, or solubility, without deleterious effect due to molar gas volume, flammability mitigation, or GWP reduction. These co-agents include but are not limited to those described previously.

Color-Changing Nozzles

The color-changing aspects of the invention above, use thermochromism which is typically implemented via one of two common approaches: liquid crystals and leuco dyes. Liquid crystals are used in precision applications, as their responses can be engineered to accurate temperatures, but their color range is limited by their principle of operation. Leuco dyes allow wider range of colors to be used, but their response temperatures are more difficult to set with accuracy.

Some liquid crystals are capable of displaying different colors at different temperatures. This change is dependent on selective reflection of certain wavelengths by the crystalline structure of the material, as it changes between the low-temperature crystalline phase, through anisotropic chiral or twisted nematic phase, to the high-temperature isotropic liquid phase. Only the nematic mesophase has thermochromic properties. This restricts the effective temperature range of the material.

The twisted nematic phase has the molecules oriented in layers with regularly changing orientation, which gives them periodic spacing. The light passing through the crystal undergoes Bragg diffraction on these layers, and the wavelength with the greatest constructive interference is reflected back, which is perceived as a spectral color. A change in the crystal temperature can result in a change of spacing between the layers and therefore in the reflected wavelength. The color of the thermochromic liquid crystal can therefore continuously range from non-reflective (black) through the spectral colors to black again, depending on the temperature. Typically, the high temperature state will reflect blue-violet, while the low-temperature state will reflect red-orange. Since blue is a shorter wavelength than red, this indicates that the distance of layer spacing is reduced by heating through the liquid-crystal state.

Some such materials are cholesteryl nonanoate or cyanobiphenyls. Liquid crystals used in dyes and inks often come microencapsulated, in the form of suspension. Liquid crystals are used in applications where the color change has to be accurately defined.

Thermochromic dyes are based on mixtures of leuco dyes with suitable other chemicals, displaying a color change (usually between the colorless leuco form and the colored form) in dependence on temperature. The dyes are rarely applied on materials directly; they are usually in the form of microcapsules with the mixture sealed inside. An illustrative example would include microcapsules with crystal violet lactone, weak acid, and a dissociable salt dissolved in dodecanol; when the solvent is solid, the dye exists in its lactone leuco form, while when the solvent melts, the salt dissociates, the pH inside the microcapsule lowers, the dye becomes protonated, its lactone ring opens, and its absorption spectrum shifts drastically, therefore it becomes deeply violet. In this case the apparent thermochromism is in fact halochromism.

The dyes most commonly used are spirolactones, fluorans, spiropyrans, and fulgides. The weak acids include bisphenol A, parabens, 1,2,3-triazole derivates, and 4-hydroxycoumarin and act as proton donors, changing the dye molecule between its leuco form and its protonated colored form; stronger acids would make the change irreversible.

Leuco dyes have less accurate temperature response than liquid crystals. They are suitable for general indicators of approximate temperature. They are usually used in combination with some other pigment, producing a color change between the color of the base pigment and the color of the pigment combined with the color of the non-leuco form of the leuco dye. Organic leuco dyes are available for temperature ranges between about 23° F. (−5° C.) and about 140° F. (60° C.), in wide range of colors. The color change usually happens in about a 5.4° F. (3° C.) interval.

The size of the microcapsules typically ranges between 3-5 μm (over 10 times larger than regular pigment particles), which requires some adjustments to printing and manufacturing processes.

Thermochromic paints use liquid crystals or leuco dye technology. After absorbing a certain amount of light or heat, the crystalline or molecular structure of the pigment reversibly changes in such a way that it absorbs and emits light at a different wavelength than at lower temperatures.

The thermochromic dyes contained either within or affixed upon either the disposable nozzle or hoses may be configured to change the color of the composition in various ways. For example, in one embodiment, once the composition reaches a selected temperature, the composition may change from a base color to a white color or a clear color. In another embodiment, a pigment or dye that does not change color based on temperature may be present for providing a base color. The thermochromic dyes, on the other hand, can be included in order to change the composition from the base color to at least one other color.

In one particular embodiment, the plurality of thermochromic dyes are configured to cause the cleansing composition to change color over a temperature range of at least about 3° C., such as at least about 5° C., once the composition is heated to a selected temperature. For example, multiple thermochromic dyes may be present within the cleansing composition so that the dyes change color as the composition gradually increases in temperature. For instance, in one embodiment, a first thermochromic dye may be present that changes color at a temperature of from about 23° C. to about 28° C. and a second thermochromic dye may be present that changes color at a temperature of from about 27° C. to about 32° C. If desired, a third thermochromic dye may also be present that changes color at a temperature of from about 31° C. to about 36° C. In this manner, the cleansing composition changes color at the selected temperature and then continues to change color in a stepwise manner as the temperature of the composition continues to increase. It should be understood that the above temperature ranges are for exemplary and illustrative purposes only.

Any thermochromic substance that undergoes a color change at the desired temperature may generally be employed in the present disclosure. For example, liquid crystals may be employed as a thermochromic substance in some embodiments. The wavelength of light ("color") reflected by liquid crystals depends in part on the pitch of the helical structure of the liquid crystal molecules. Because the length of this pitch varies with temperature, the color of the liquid crystals is also a function of temperature. One particular type of liquid crystal that may be used in the present disclosure is a liquid crystal cholesterol derivative. Exemplary liquid crystal cholesterol derivatives may include alkanoic and aralkanoic acid esters of cholesterol, alkyl esters of cholesterol carbonate, cholesterol chloride, cholesterol bromide, cholesterol acetate, cholesterol oleate, cholesterol caprylate, cholesterol oleyl-carbonate, and so forth. Other suitable liquid crystal compositions are possible and contemplated within the scope of the invention.

In addition to liquid crystals, another suitable thermochromic substance that may be employed in the present disclosure is a composition that includes a proton accepting chromogen ("Lewis base") and a solvent. The melting point of the solvent controls the temperature at which the chromogen will change color. More specifically, at a temperature below the melting point of the solvent, the chromogen generally possesses a first color (e.g., red). When the solvent is heated to its melting temperature, the chromogen may become protonated or deprotonated, thereby resulting in a shift of the absorption maxima. The nature of the color change depends on a variety of factors, including the type of proton-accepting chromogen utilized and the presence of any additional temperature-insensitive chromogens. Regardless, the color change is typically reversible.

Although not required, the proton-accepting chromogen is typically an organic dye, such as a leuco dye. In solution, the protonated form of the leuco dye predominates at acidic pH levels (e.g., pH of about 4 or less). When the solution is made more alkaline through deprotonation, however, a color change occurs. Of course, the position of this equilibrium may be shifted with temperature when other components are present. Suitable and non-limiting examples of leuco dyes for use in the present disclosure may include, for instance, phthalides; phthalanes; substituted phthalides or phthalanes, such as triphenylmethane phthalides, triphenylmethanes, or diphenylmethanes; acyl-leucomethylene blue compounds; fluoranes; indolylphthalides, spiropyranes; cumarins; and so forth. Exemplary fluoranes include, for instance, 3,3'-dimethoxyfluorane, 3,6-dimethoxyfluorane, 3,6-di-butoxyfluorane, 3-chloro-6-phenylamino-flourane, 3-diethylamino-6-dimethylfluorane, 3-diethylamino-6-methyl-7-chlorofluorane, and 3-diethyl-7,8-benzofluorane, 3,3'-bis-(p-dimethyl-aminophenyl)-7-phenylaminofluorane, 3-diethylamino-6-methyl-7-phenylamino-fluorane, 3-diethylamino-7-phenyl-aminofluorane, and 2-anilino-3-methyl-6-diethylamino-fluorane. Likewise, exemplary phthalides include 3,3',3"-tris(p-dimethylamino-phenyl)phthalide, 3,3'-bis(p-dimethyl-aminophenyl)phthalide, 3,3-bis(p-diethyl-amino-phenyl)-6-dimethylamino-phthalide, 3-(4-diethylaminophenyl)-3-(1-ethyl-2-methylindol-3-yl)phthalide, and 3-(4-diethylamino-2-methyl)phenyl-3-(1,2-dimethylindol-3-yl)phthalide.

Although any solvent for the thermochromic dye may generally be employed in the present disclosure, it is typically desired that the solvent have a low volatility. For example, the solvent may have a boiling point of about 150° C. or higher, and in some embodiments, from about 170° C. to 280° C. Likewise, the melting temperature of the solvent is also typically from about 25° C. to about 40° C., and in some embodiments, from about 30° C. to about 37° C. Examples of suitable solvents may include saturated or unsaturated alcohols containing about 6 to 30 carbon atoms, such as octyl alcohol, dodecyl alcohol, lauryl alcohol, cetyl alcohol, myristyl alcohol, stearyl alcohol, behenyl alcohol, geraniol, etc.; esters of saturated or unsaturated alcohols containing about 6 to 30 carbon atoms, such as butyl stearate, methyl stearate, lauryl laurate, lauryl stearate, stearyl laurate, methyl myristate, decyl myristate, lauryl myristate, butyl stearate, lauryl palmitate, decyl palmitate, palmitic acid glyceride, etc.; azomethines, such as benzylideneaniline, benzylidenelaurylamide, o-methoxybenzylidene laurylamine, benzylidene p-toluidine, p-cumylbenzylidene, etc.; amides, such as acetamide, stearamide, etc.; and so forth.

The thermochromic composition may also include a proton-donating agent (also referred to as a "color developer") to facilitate the reversibility of the color change. Such proton-donating agents may include, for instance, phenols, azoles, organic acids, esters of organic acids, and salts of organic acids. Exemplary phenols may include phenylphenol, bisphenol A, cresol, resorcinol, chlorolucinol, b-naphthol, 1,5-dihydroxynaphthalene, pyrocatechol, pyrogallol, trimer of p-chlorophenol-formaldehyde condensate, etc. Exemplary azoles may include benzotriaoles, such as 5-chlorobenzotriazole, 4-laurylaminosulfobenzotriazole, 5-butylbenzotriazole, dibenzotriazole, 2-oxybenzotriazole, 5-ethoxycarbonylbenzotriazole, etc.; imidazoles, such as oxybenzimidazole, etc.; tetrazoles; and so forth. Exemplary organic acids may include aromatic carboxylic acids, such as salicylic acid, methylenebissalicylic acid, resorcylic acid, gallic acid, benzoic acid, p-oxybenzoic acid, pyromellitic acid, b-naphthoic acid, tannic acid, toluic acid, trimellitic acid, phthalic acid, terephthalic acid, anthranilic acid, etc.; aliphatic carboxylic acids, such as stearic acid, 1,2-hydroxystearic acid, tartaric acid, citric acid, oxalic acid, lauric acid, etc.; and so forth. Exemplary esters may include alkyl esters of aromatic carboxylic acids in which the alkyl moiety has 1 to 6 carbon atoms, such as butyl gallate, ethyl p-hydroxybenzoate, methyl salicylate, etc.

The amount of the proton-accepting chromogen employed may generally vary, but is typically from about 2 wt. % to about 20 wt. %, and in some embodiments, from about 5 to about 15 wt. % of the thermochromic substance. Likewise, the proton-donating agent may constitute from about 5 to about 40 wt. %, and in some embodiments, from about 10 wt. % to about 30 wt. % of the thermochromic substance. In addition, the solvent may constitute from about 50 wt. % to about 95 wt. %, and in some embodiments, from about 65 wt. % to about 85 wt. % of the thermochromic composition.

Regardless of the particular thermochromic substance employed, it may be microencapsulated to enhance the stability of the substance during processing. For example, the thermochromic substance may be mixed with a thermosetting resin according to any conventional method, such as interfacial polymerization, in-situ polymerization, etc. The thermosetting resin may include, for example, polyester resins, polyurethane resins, melamine resins, epoxy resins, diallyl phthalate resins, vinylester resins, and so forth. The resulting mixture may then be granulated and optionally coated with a hydrophilic macromolecular compound, such as alginic acid and salts thereof, carrageenan, pectin, gelatin and the like, semisynthetic macromolecular compounds such as methylcellulose, cationized starch, carboxymethylcellulose, carboxymethylated starch, vinyl polymers (e.g., polyvinyl alcohol), polyvinylpyrrolidone, polyacrylic acid, polyacrylamide, maleic acid copolymers, and so forth. The resulting thermochromic microcapsules typically have a size of from about 1 to about 50 micrometers, and in some embodiments, from about 3 to about 15 micrometers. Various other microencapsulation techniques may also be used.

Thermochromic dyes are commercially available from various sources. In one embodiment, for instance, thermochromic dyes marketed by Chromadic Creations, Hamilton, Ontario and sold under the trade name SpectraBurst Thermochromic Polypropylene.

The thermochromic dyes can be present in the composition in an amount sufficient to have a visual effect on the color of the composition. The amount or concentration of the dyes can also be increased or decreased depending upon the desired intensity of any color. In general, the thermochromic dyes may be present in the composition in an amount from about 0.01% by weight to about 9% by weight, such as from about 0.1% by weight to about 3% by weight. For instance, in one particular embodiment, the thermochromic dyes may be present in an amount from about 0.3% to about 1.5% by weight.

As described above, thermochromic dyes typically change from a specific color to clear at a certain temperature, e.g., dark blue below 60° F. (15.6° C.) to transparent or translucent above 60° F. (15.6° C.). If desired, other pigments or dyes can be added to the composition in order to provide a background color that remains constant independent of the temperature of the composition. By adding other pigments or dyes in combination with the thermochromic dyes to the composition, the thermochromic dyes can provide a color change at certain temperatures rather than just a loss of color should the thermochromic dye become clear. For instance, a non-thermochromic pigment, such as a yellow pigment, may be used in conjunction with a plurality of thermochromic dyes, such as a red dye and a blue dye. When all combined together, the cleansing composition may have a dark color. As the composition is increased in temperature, the red thermochromic dye may turn clear changing the color to a green shade (a combination of yellow and blue). As the temperature further increases, the blue thermochromic dye turns clear causing the composition to turn yellow.

It should be understood, that all different sorts of thermochromic dyes and non-thermochromic pigments and dyes may be combined in order to produce a composition having a desired base color and one that undergoes desired color changes. The color changes, for instance, can be somewhat dramatic and fanciful. For instance, in one embodiment, the composition may change from green to yellow to red.

In an alternative embodiment, however, the composition can contain different thermochromic dyes all having the same color. As the temperature of the composition is increased, however, the shade or intensity of the color can change. For instance, the composition can change from a vibrant blue to a light blue to a clear color.

In addition to the above, it should be understood that many alterations and permutations are possible. Any of a variety of colors and shades can be mixed in order to undergo color changes as a function of temperature.

The invention will now be described in a series of one-component and two-component polyurethane adhesive foam composition examples.

EXAMPLE

TABLE I

Exemplary polyurethane adhesive formulations

| Composition | A | B | C | D | E | F | G |
|---|---|---|---|---|---|---|---|
| Stepanpol PS 2352 | 19.6 |  | 15.2 |  |  |  |  |
| Stepanpol PS 1752 |  | 20.5 |  |  |  |  |  |
| Terol 352 | 35.2 | 39.7 | 36.3 | 44.8 |  |  |  |
| Poly-G 30-168 |  |  |  | 35.0 |  | 28.8 |  |
| Poly-G 20-112 |  |  |  | 1.8 | 65.0 |  |  |
| Poly-G 30-42 |  |  |  |  |  | 27.7 |  |
| Poly-G 55-112 |  |  |  |  |  | 5.6 | 86.5 |
| Glycerine | 1.8 | 1.8 |  | 15.0 |  |  |  |
| 1,4-butanediol |  |  |  |  |  | 12.0 |  |
| Diethylene glycol |  |  |  |  |  | 5.0 |  |
| 1-hexadecene |  |  |  |  |  | 3.7 |  |

TABLE I-continued

Exemplary polyurethane adhesive formulations

| Composition | A | B | C | D | E | F | G |
|---|---|---|---|---|---|---|---|
| TCPP | 36.6 | 35.0 | 36.6 |  | 30.0 |  |  |
| PHT-4 Diol |  |  | 5.1 |  |  |  |  |
| Paroil 45 |  |  |  |  |  |  | 10.0 |
| Tegostab B 8870 | 3.0 |  | 2.0 |  | 3.0 |  | 0.5 |
| Tegostab B 8250 |  |  |  | 2.0 |  |  |  |
| Dabco DC 198 |  | 1.2 |  |  |  |  |  |
| Dabco DC198 |  |  |  |  |  |  | 0.6 |
| Silstab 1635 |  | 1.5 |  | 0.5 |  |  |  |
| Jeffamine D-2000 |  |  |  |  |  |  | 11.6 |
| Pluraonic L-31 |  |  | 1.0 |  |  |  |  |
| Polycat 12 | 0.1 | 0.2 | 0.8 | 0.2 |  |  |  |
| Dabco T120 | 0.85 | 0.1 |  | 0.2 |  |  |  |
| Dabco K-15 |  |  | 1.0 |  |  |  |  |
| Dabco TMR-20 | 1.2 |  |  |  |  |  |  |
| DMDEE |  |  |  |  |  | 2.0 | 3.0 |
| Baytec 505 |  |  |  |  |  | 4.7 |  |
| Jeffcat ZR-70 |  |  |  |  |  |  | 0.3 |
| Water | 1.65 |  | 1.9 | 0.5 |  |  |  |
| Reactint Blue X17AB |  |  | 0.1 |  |  |  |  |
| Total | 100% | 100% | 100% | 100% | 100% | 100% | 100% |

The above formulations A through D and F were made into two-component polyurethane foams and sprayed in accord with the compositions for the "A" and "B" cylinders per below for the two-component foams using the blowing agent HFO-1234ze for formulations A through D and using the blowing agent HFC-134a for formulation F; and in accord with the single composition for the one-component foams, formulations E and G using the blowing agents HFO-1234ze and HFO-1234zd respectively.

TABLE II

| | Composition (wt. %) | | | | | | |
|---|---|---|---|---|---|---|---|
| Composition | A | B | C | D | E | F | G |
| B-side | 86% | 83% | 86% | 88% | 35.3% | 83.2% | 41.0% |
| 1234ze (Solstice GBA) | 14% | 17% | 14% | 12% |  |  |  |
| R-134a |  |  |  |  |  | 16.8% |  |
| | 100% | 100% | 100% | 100% |  | 100% |  |
| A-side isocyanate | 93% | 79.9% | 93% | 66.5% | 47.7% | 82.0% | 41.0% |
| TCPP |  | 13.6% |  | 28.5% |  | 10.5% |  |
| Silstab 2850 |  | 0.5% |  |  |  | 1.0% |  |
| 1234ze (Solstice GBA) | 7.0% | 6.0% | 7.0% | 5.0% |  |  |  |
| R-134a |  |  |  |  |  | 6.5% |  |
| | 100% | 100% | 100% | 100% |  | 100% |  |
| One-Component 1234ze (Solstice GBA) |  |  |  |  | 17.0% |  |  |
| 1234-zd |  |  |  |  |  |  | 18.0% |
| | | | | | 100% | | 100% |

As tested above, sample A is a ventilation control foam; sample B is a liner adhesive; sample C is a two-component roofing adhesive; sample D is an elastomeric adhesive; sample E is a one-component roofing tile adhesive; sample F is a traditional polyurethane adhesive; and sample G is a one-component high flow adhesive.

TABLE III

Characterization

| Comp tested | OCF[(1)]/ SPF[(2)] | Blowing agent | Working Pressure (psi) | time >2 min. | Instant grab? | Peel <0.25/in. | Peel Sub. Failure | Shear PE <0.25/in | Shear Sub. Failure | Pass |
|---|---|---|---|---|---|---|---|---|---|---|
| A | SPF | 1234ze | 150/185 | No | Yes | No | Yes | Yes | Yes | No |
| B | SPF | 1234ze | 170/215 | Yes | Yes | Yes | Yes | Yes | Yes | Yes |
| C | SPF | 1234ze | >220 | Yes | No | No | Yes | Yes | Yes | No |
| D | SPF | 1234ze | 170/195 | Yes | No | Yes | Yes | Yes | Yes | No |
| E | OCF | 1234ze | 110 | Yes | Yes | No | Yes | Yes | Yes | Yes |
| F | SPF | 134a | 220/220 | Yes | No | Yes | No | Yes | No | Yes |
| G | OCF | 1234zd | ~200 | Yes | Yes | Yes | No | Yes | No | Yes |

[(1)]OCF = one-component foam;
[(2)](2) SPF = spray polyurethane two-component foam As used to characterize the compositions tested, the following criteria was used:

Working time>2 minutes: Does the product require greater than two minutes to undergo tack-free conditions under Standard Laboratory Conditions (23° C.+/−2° C., 50° F.+/−5%, as defined in ASTM C1806-14)? If so, then this product passes.

Instant Grab: After the product is applied and the second substrate is placed on top of the first, is there resistance to moving the two substrates? That is, is the adhesive sticky upon initial joining of the two substrates, or is it more liquid-like? Consideration was given to ensure a reasonable amount of adhesive was applied for each test setup. Actual chemical weights were calculated.

Peel PE<0.25 in: For the peel, 12"×12" swatches of the grass and 12"×12" swatches of the backing were glued with adhesive in a 6"×12" area. Tape was used to prevent adhesive bleed. The Product was then cut into 1"×12" strips so that adhesive would cover a 1"×6" area. Foam height was measured between the two substrates. If average foam Post Expansion (PE) was less than 0.25", this was considered a pass.

Peel Sub. Failure: Following a modification of ASTM D903-98, was there any substrate failure, or was it solely adhesive/cohesive failure? ASTM D5573-99 was used for failure classification. Substrate failure was classified as either Light Fiber Tear Failure (LFT), Fiber Tear Failure (FT), or Stock-Break Failure (SB). If the substrate failed for the majority of pulls, the product was considered as passing the test.

Shear PE<0.25 in: For the shear, 6"×12" swatches of the grass and 6"×12" swatches of the backing were glued with adhesive overlap of 2.5"×12" to form a lap-shear setup. Tape was used to prevent adhesive bleed. The Product was then cut into 1"×9.5" strips so that the adhesive would cover a 1"×2.5" area. Foam height was measured between the two substrates. If average foam Post Expansion (PE) was less than 0.25", this was considered a pass.

Shear Sub. Failure: Following a modification of ASTM D3164-03, was there any substrate failure? I utilized ASTM D5573-99 for failure classification. Substrate failure was classified as either Light Fiber Tear Failure (LFT), Fiber Tear Failure (FT), or Stock-Break Failure (SB). If the substrate failed for the majority of pulls, the product was considered as passing the test.

OVERALL: Failing less than two criteria was considered a pass, although some leeway was given. Based on this assessment, four products passed this screening, while three did not. Some products were borderline, as the post expansion was relatively high in the peel test. This makes sense, as some compositions are designed to undergo expansion with curing.

Of the above four (4) formulations that successfully met the criteria defined, further characterization was undertaken as shown in Table IV.

TABLE IV

Characterization (continued)

| Comp tested | Liquid A/B | Gel (liq.) | Tack (liq.) | Vol (ml) | Density (pcf) | Foam wt. | Gel, foam | Tack, foam | Vol (ml) | Density (pcf) |
|---|---|---|---|---|---|---|---|---|---|---|
| A | | | | | | | | | | |
| B | 1.13 | 0:58 | 2:57 | 244.24 | 8.24 | 7.1 | 1:20 | 4:20 | 120.86 | 3.67 |
| C | | | | | | | | | | |
| D | | | | | | | | | | |
| E | 1.36 | 7:45 | 10:50 | Did not fully cure | — | 2.45 | 3:53 | 6:42 | 62.65 | 2.44 |
| F | 1.26 | 0:57 | 1:48 | Over the top (>287.86 ml) | >8.96 | 4.71 | 2:04 | 6:55 | 36.74 | 8.00 |
| G | 1.01 | 7:30 | 18:30 | Did not fully cure | — | 6.55 | 12:45 | 16:00 | 38.25 | 10.69 |

In the above tests for the four (4) adhesives which met the passing criteria, the first few columns deal with liquid chemical, while the next columns deal with the foam. For the liquid chemical, line cards were taken and blowing agent removed and the liquid chemical A/B ratios were determined. The numbers were normalized to 32 grams or about 0.5 inches from the bottom of the cups used. The chemicals were mixed for five (5) seconds under 63% relative humidity, 67° F. environmental conditions. The gel and tack-free times were measured. After two (2) days, the volume of the foam was determined via displacement of water and the foam density was calculated.

As seen from the data, the blowing reagent slows down reactivity rates for two-component systems. This was not the case for one-component system but considering that one-component systems require moisture to cure (in addition to the chemical systems), it is logical that a higher density of chemical requires more moisture to cure and therefore, would take longer time to react.

The blowing agent also reduces density. This means that for systems with blowing agent, one would expect a greater surface coverage than systems without blowing agent per weight of material.

Figure 7:
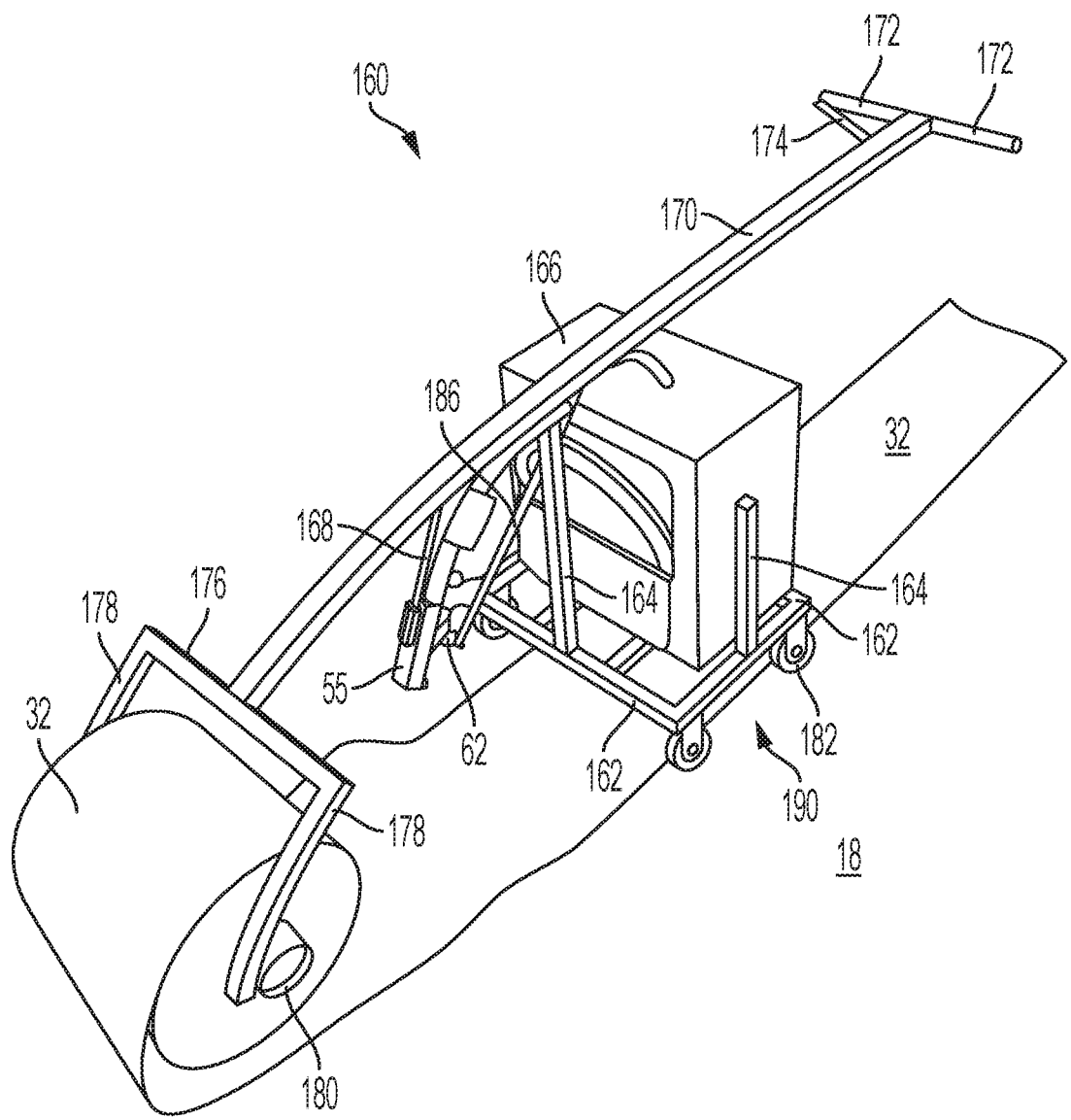
FIG. 7 is a perspective view of an applicator cart for the two-stream or three-stream spray gun wherein the cart dos not have a traditional front wheel, but rather has a spiral take-off base layer for rolling.
Figure 12:
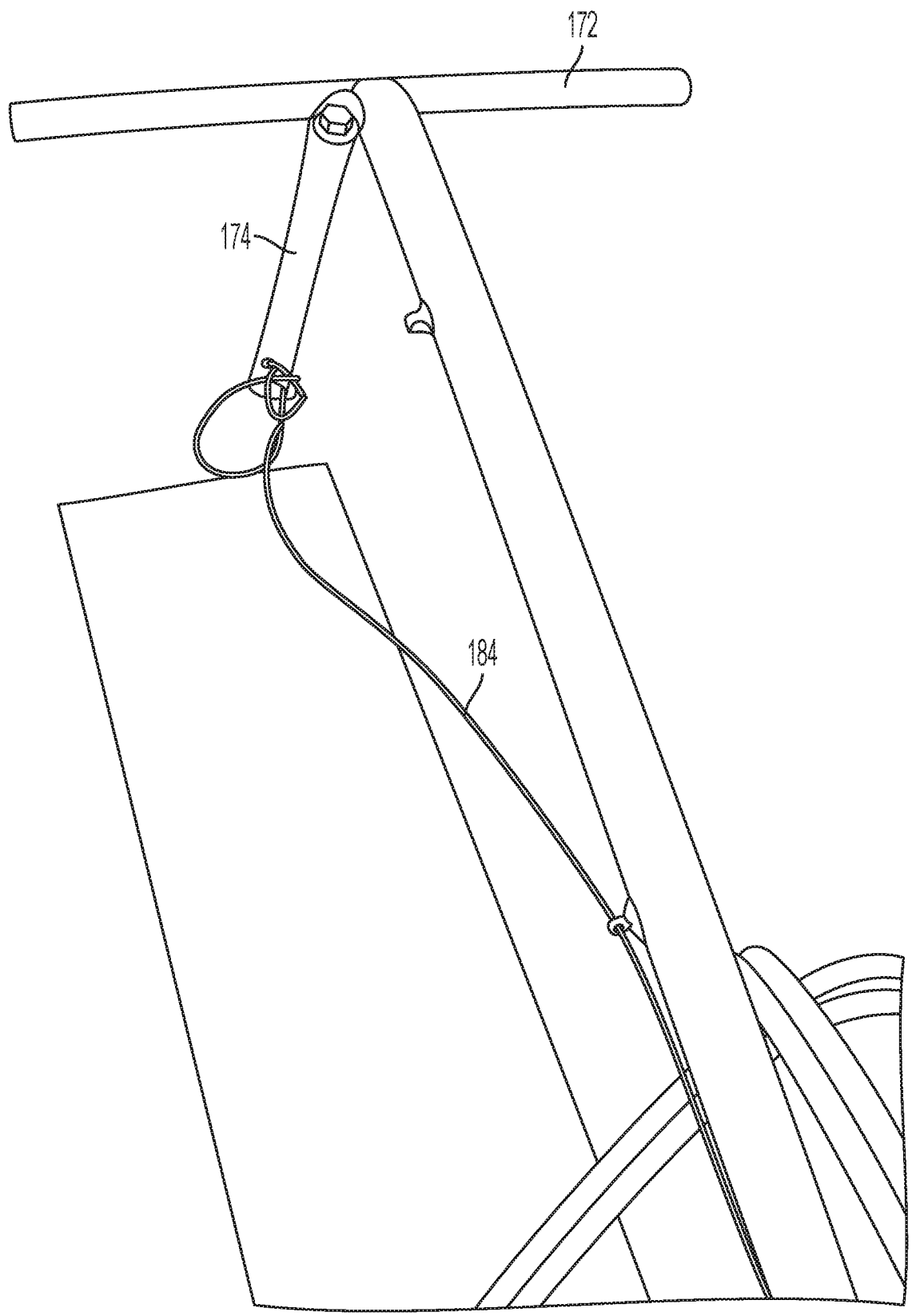
FIG. 12 is an enlarged perspective view of the connected wire within the raceway illustrating control of the axial movement via pivotal movement at the rear handle of the cart.

While the above approach is effective in seaming adjacent swaths of artificial turf, recognizing that any swaths of adjacent material which needs to be seamed (e.g., carpet) could be applied using this method, it should be recognized that it is a labor-intensive operation, requiring at least two to three installers. As illustrated in FIG. 7, this manpower intensive process may be reduced by the use of a applicator cart 160 which uses polyurethane spray foams purchasable in kit form, either one-component or preferably two-component, and applied to base material 18 by use of the applicator cart. The cart has several sections, a front yoke (see 176, 178) with a rearwardly-extending bar, typically hollow 170 terminating in a pair of laterally projecting handles 172. Each terminus of the yoke is securely attached to an axle hub 180, the centrally disposed axle of which can be moved in a transverse direction to accept a spirally-wound plastic role of substrate which pays out onto substrate 32 upon forward movement of the cart. Interposed between yoke 176, 178 and rear handle 172 is container frame 190 having base 162 and at least two, preferably three upwardly-projecting vertical sides 164, which are dimensioned to accept box 166 containing at least one, preferably at least two pressurized reactant cylinders. In a typical configuration for a two-component polyurethane foam, one pressurized reactant cylinder is the "A" isocyanate cylinder while the other pressurized reactant cylinder being the "B" cylinder, the "B" cylinder further including a complex mixture of polyols, catalysts, flame retardants, surfactants, blowing agents and propellants, etc. At least one of vertical sides 164 of container frame 190 is fixedly attached to bar 170 and to at least one horizontal base side 162 of container frame 190. Projecting downwardly from handle 170 and illustrated positioned in front of the open container frame in the figure, is connector 168 which is fixedly secured to the bottom side of bar 170. Trigger 62 of spray gun 55 is pivotally rotated by wire 184 (see FIG. 12) when pivotably rotatable handle 174 is pulled in a rearward direction thereby pulling wire 184 which is positioned within raceway 186. In one aspect of the invention, removable tip 64 of spray gun 55 is positioned approximately twelve (12) inches above substrate 32.

Figure 8:
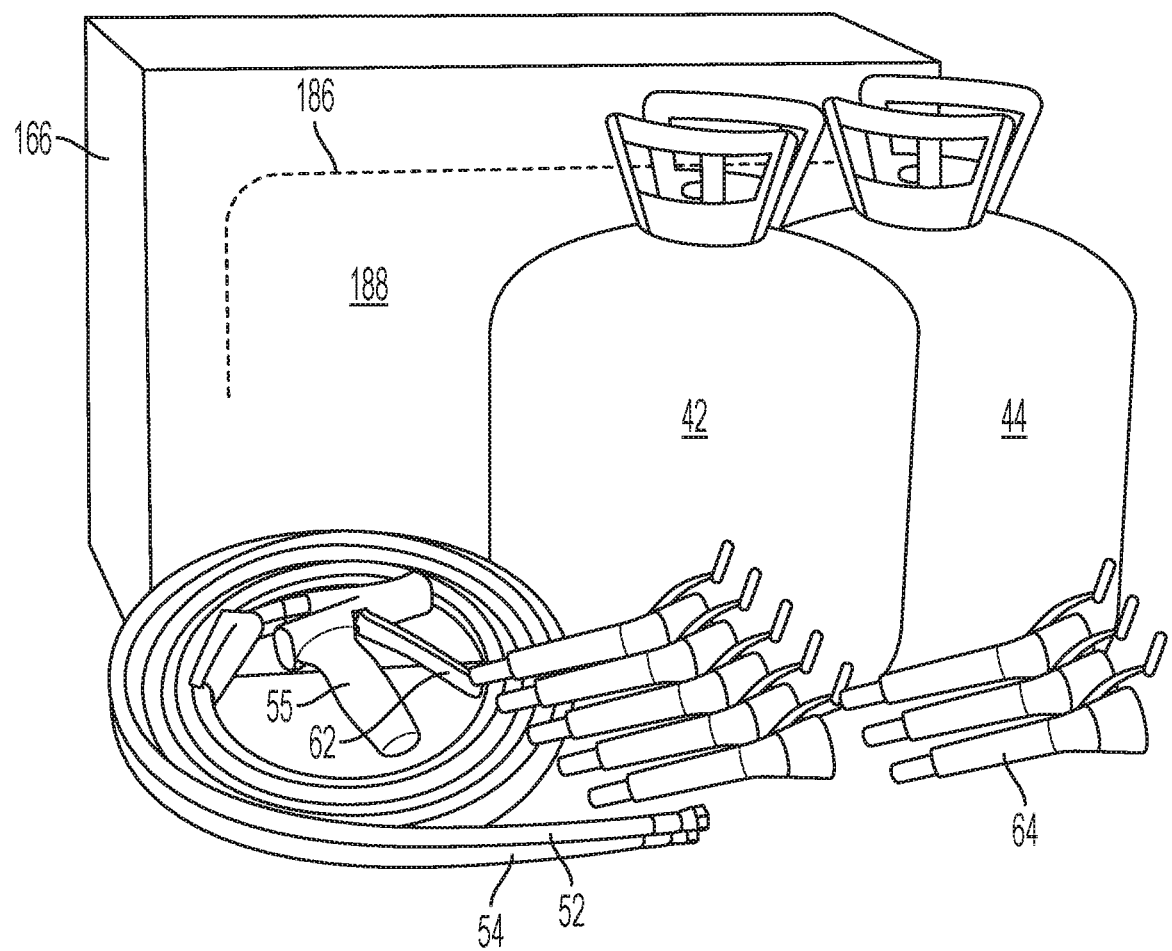
FIG. 8 is a perspective view of the two-component spray adhesive showing an "A" and a "B" cylinder plus two-stream spray gun applicator with removably detachable static mixing nozzles, preferably which change color to indicate application reaction temperature.
Figure 9:
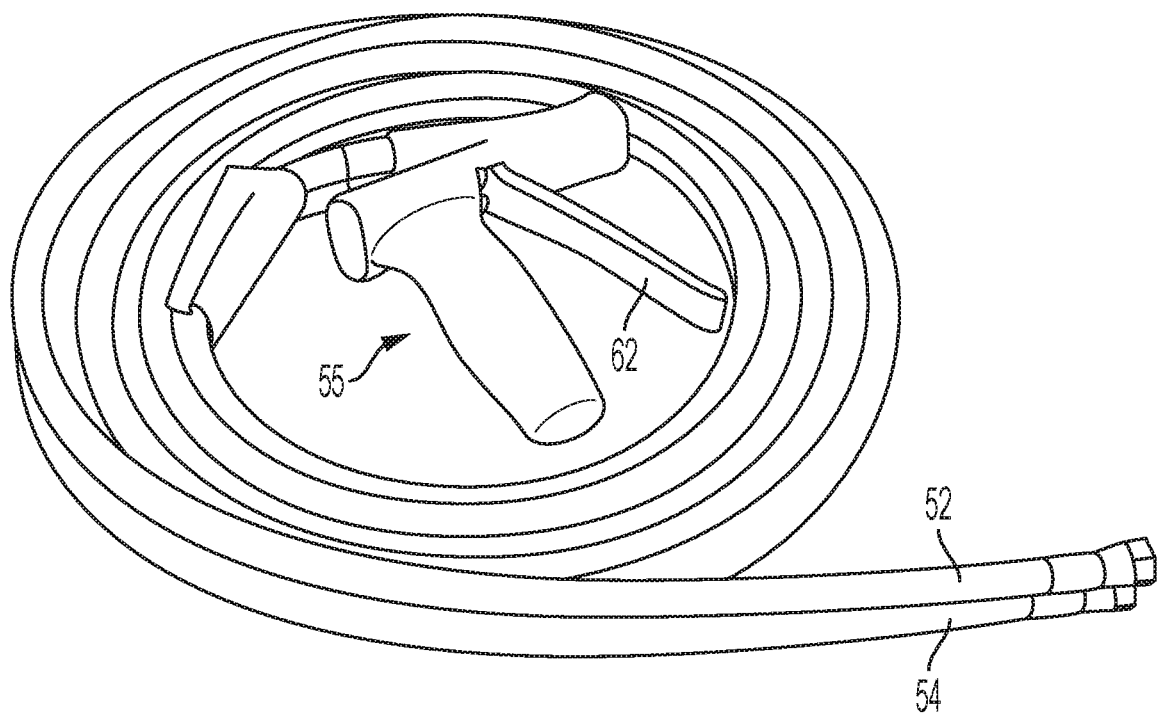
FIG. 9 is an enlarged view of the two-stream spray gun without any nozzle affixed thereto with its "A" and "B" hoses in a coiled configuration as typically shipped to the consumer.

As better illustrated in FIGS. 8 & 9, box 166 will contain and "A" and a "B" cylinder, 42, 44 in addition to a spray gun 55, a two-component spray gun being illustrated in the Figure with a pivotable trigger 62 and a pair of hoses 52, 54 one of which is affixed to each of cylinder "A" and "B". A plurality of removable static mixer spray nozzles 64 is typically included within each box. In one aspect, box 166 will contain a bendable segment 188 defined by a generally U-shaped perforation score line 186, for maintaining at least some integrity of the box, yet allow user-access to the contents therein. One example of this kit is "Sport Adhesive™" manufactured by ICP Adhesives and Sealants, Inc.

Figure 10:
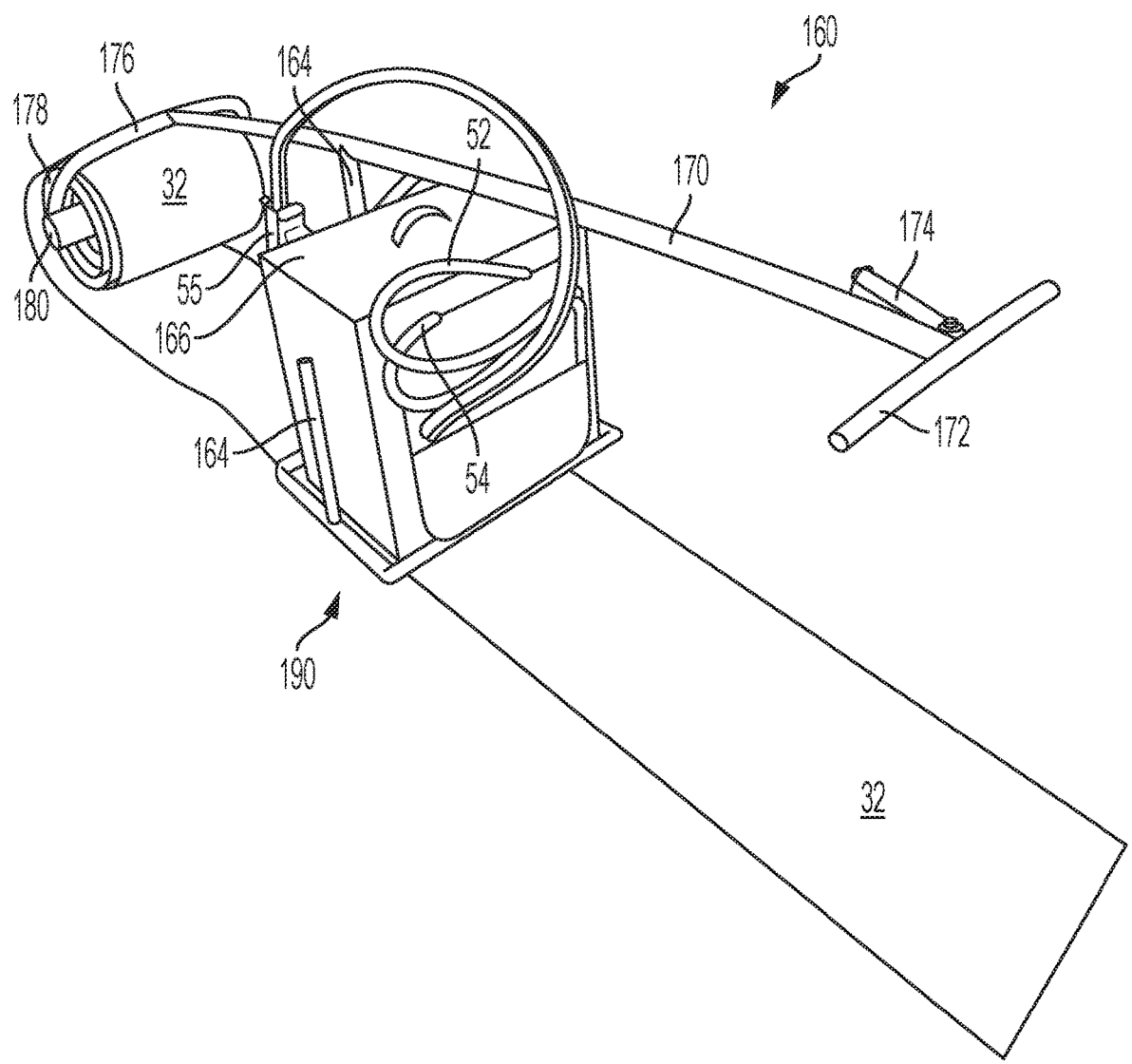
FIG. 10 is a rear perspective view of the applicator cart showing a spiral take-off front wheel, a spray gun affixed rearward of the spiral take-off front wheel and forward of the box container for the reactant cylinders, the spray gun activated by a pivotably moveable trigger affixed to the rear handle of the applicator cart.
Figure 11:
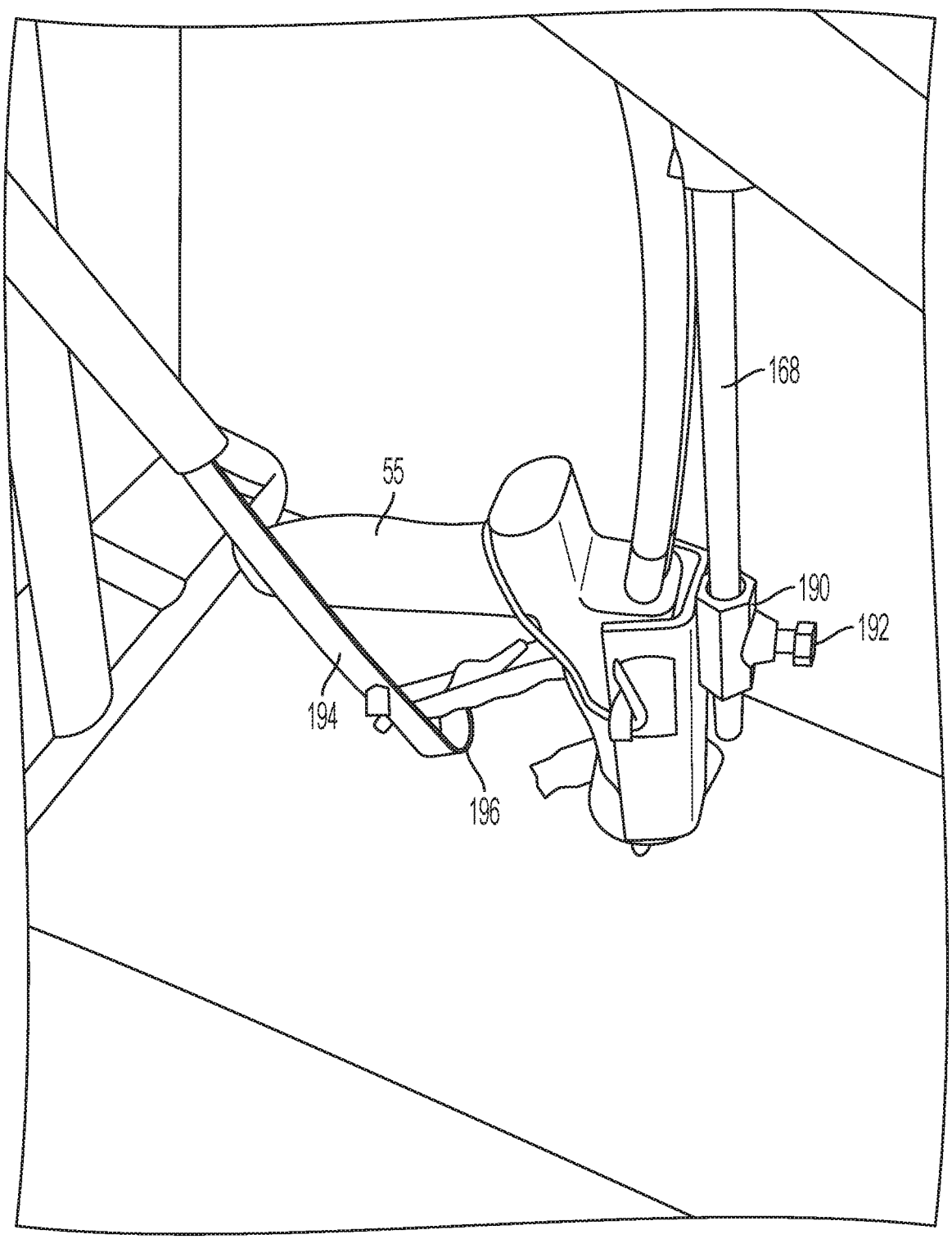
FIG. 11 is an expanded perspective view of the raceway within which axial movement controls the flow of the reactant chemicals by pivoting movement of the trigger on the spray gun.

As shown in FIG. 10, one of the unique features of the applicator cart is that in one embodiment, it may be a cart which is wheel-less in the front of cart 160. The front wheel is the spirally wound turf substrate pay-out roll 32. The cart can be used in several ways. One aspect involves lifting the entire applicator cart 160 by the handle thereby having only the spirally-wound roll of substrate 32 in contact with the base material 18. In that embodiment, the user will lift the reactant receptacle 190 completely off the ground with the only contact point being turf substrate pay-out roll 32. In another aspect of the invention, reactant receptacle 190 will have at least one, preferably two wheels 182 positioned on opposed sides of the reactant receptacle and the user simply pushes the applicator cart using a combination of wheels 182 in combination with front payout roll 32 as illustrated in FIG. 7. The orientation of box 166 as determined by the direction of the perforations 186 is not particularly relevant, and can be forward-facing or rearward-facing.

The cart has a trigger extension for spray gun 55, the spray gun sold commercially under the trademark Handi-Gun®, by ICP Adhesives and Sealants, Inc. The gun is held in place at about one (1) foot above the tape and application spray rate and flow control is accomplished by pivotal movement of lever 174 at the handle 172 of cart 160. Spray gun trigger 62 is operatively connected to lever 174 by mechanical means, such as a wire 184, better illustrated in FIG. 12 at one end and operatively connected to the trigger by a second mechanical means, illustrated as a hook 194 having a "J-shaped" end 196. The distance between the foam applicator tip and the base material 32 is controlled by sliding rod 168 within bracket 190 and tightening set screw 192. The applicator cart turns the application of the turf seaming and foam into a one-person operation.

Therefore, what has been illustrated is that at least the following factors play a role in obtaining the correct polyurethane foam adhesive: choice of polyol (whether polyester polyol or polyether polyol) in combination with the choice of plasticizer and/or surfactant in combination with the catalyst, in combination with the blowing agent, and further in combination with the choice of a one-component or a two-component polyurethane foam, all play a role in the characteristics of the synthesized adhesive.

The best mode for carrying out the invention has been described for purposes of illustrating the best mode known to the applicant at the time. The examples are illustrative only and not meant to limit the invention, as measured by the scope and merit of the claims. The invention has been described with reference to preferred and alternate embodiments. Obviously, modifications and alterations will occur to others upon the reading and understanding of the specification. It is intended to include all such modifications and alterations insofar as they come within the scope of the appended claims or the equivalents thereof.

What is claimed is:

1. An applicator for seaming adjacent materials which comprises:
   a longitudinally-extending frame having opposed front and rear ends;
      the rear end comprising a pair of laterally extending handles; and the front end comprising a yoke, said yoke dimensioned to fit a spirally wound pay-off spool of flexible substrate positioned on a hub interposed between the yoke;

a reactant container receptacle dimensioned to contain at least one pressurized reactant cylinder, the receptacle connected to the longitudinally-extending frame between the front and rear ends;

a spray gun attachment means connected to the longitudinally-extending frame at one end of the attachment means and having a spray gun affixed to an opposed end of the attachment means said spray gun having a trigger for controlling flow of material from the at least one pressurized reactant cylinder;

said spray gun further having at least one input port for receiving a hose from the at least one pressurized reactant cylinder and one output nozzle;

a pivotally-connected spray gun activation trigger on one of the pair of laterally extending handles, the activation trigger in operative communication with the trigger on the spray gun.

2. The applicator of claim 1 wherein
the pivotally-connected spray gun activation trigger is connected to the activation trigger and the trigger of the spray gun by a wire.

3. The applicator of claim 1 wherein
the reactant container receptacle dimensioned to contain at least one pressurized reactant cylinder is dimensioned to contain at least two pressurized reactant cylinders, each cylinder in fluid communication with an inlet port on the spray gun.

4. The applicator of claim 3 wherein
the reactant container further comprises at least a pair of wheels on opposed lateral sides of the reactant container.

5. The applicator of claim 3 wherein
the output nozzle is removable and replaceable.

6. The applicator of claim 5 wherein
the output nozzle is color-changeable based on a temperature within the nozzle.

7. The applicator of claim 1 wherein
the at least one input port is at least two input ports, one of said input ports for receiving a one-component foam from the at least one pressurized reactant cylinder; and another of said input ports for receiving a supplemental catalyst to reduce a tack time of a synthesized foam.

8. The applicator of claim 1 wherein
the output nozzle is removable and replaceable.

9. The applicator of claim 8 wherein
the output nozzle is color-changeable based on a temperature within the nozzle.

10. The applicator of claim 1 wherein
the at least one pressurized reactant cylinder is at a pressure between 100-250 psi.

11. A process for seaming adjacent edges which comprises:

pulling back each of the adjacent edges to create a gap;
applying a flexible substrate into the gap;
pushing an apparatus between the gap, the apparatus having
a longitudinally-extending frame having opposed front and rear ends;
the rear end comprising a pair of laterally extending handles; and
the front end comprising a yoke, said yoke dimensioned to fit a spirally wound pay-off spool of flexible substrate positioned on a hub interposed between the yoke;
a reactant container receptacle dimensioned to contain at least one pressurized reactant cylinder, the receptacle connected to the longitudinally-extending frame between the front and rear ends;
a spray gun attachment means connected to the longitudinally-extending frame at one end of the attachment means and having a spray gun affixed to an opposed end of the attachment means
said spray gun having a trigger for controlling flow of material from the at least one pressurized reactant cylinder;
said spray gun further having at least one input port for receiving a hose from the at least one pressurized reactant cylinder and one output nozzle;
a pivotally-connected spray gun activation trigger on one of the pair of laterally extending handles, the activation trigger in operative communication with the trigger on the spray gun;
activating a flow of adhesive by pivotally moving the activation trigger; and
closing the gap between the adjacent edges.

12. The method of claim 11 which further comprises the step of
lifting the apparatus while pushing.

13. The method of claim 11 wherein
the output nozzle is removeable and replaceable.

14. The method of claim 13 wherein
the output nozzle is color-changeable based on a temperature within the nozzle.

15. The method of claim 11 wherein
the adhesive is a low-pressure one-component or two-component spray polyurethane adhesive, the low-pressure polyurethane adhesive being at a pressure between 100 and 250 psi.

16. The method of claim 15 wherein
the adhesive is a two-component spray polyurethane adhesive.

17. The method of claim 15 wherein
the adhesive becomes tack-free in two minutes or less as defined in ASTM C1806-14 and having a publication date of 1 Dec. 2014.

* * * * *